Figure 6:
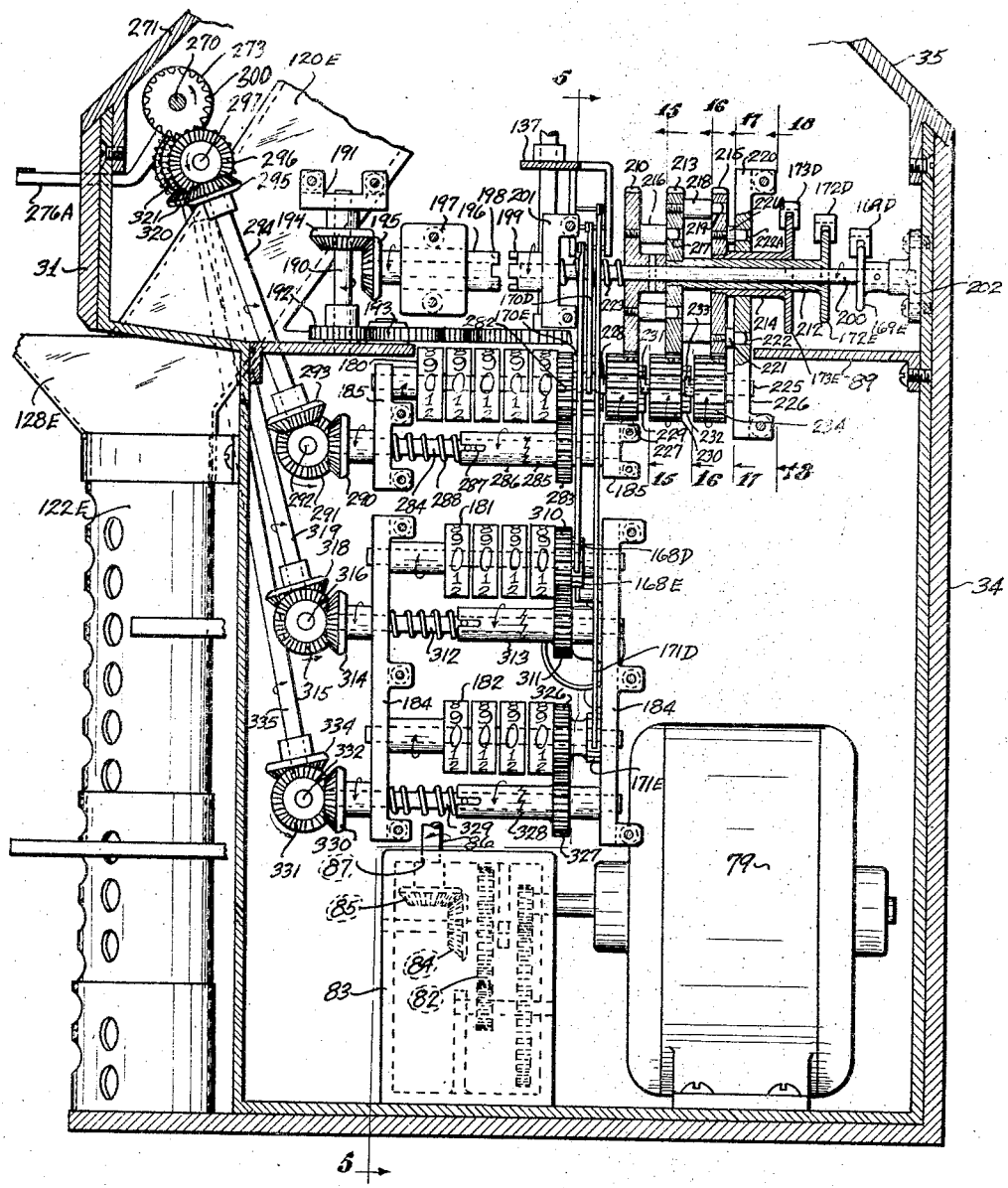

Jan. 4, 1944.  F. F. DAUGHERTY  2,338,575
COIN HANDLING AND TOTALING DEVICE
Filed Jan. 2, 1940  13 Sheets-Sheet 1
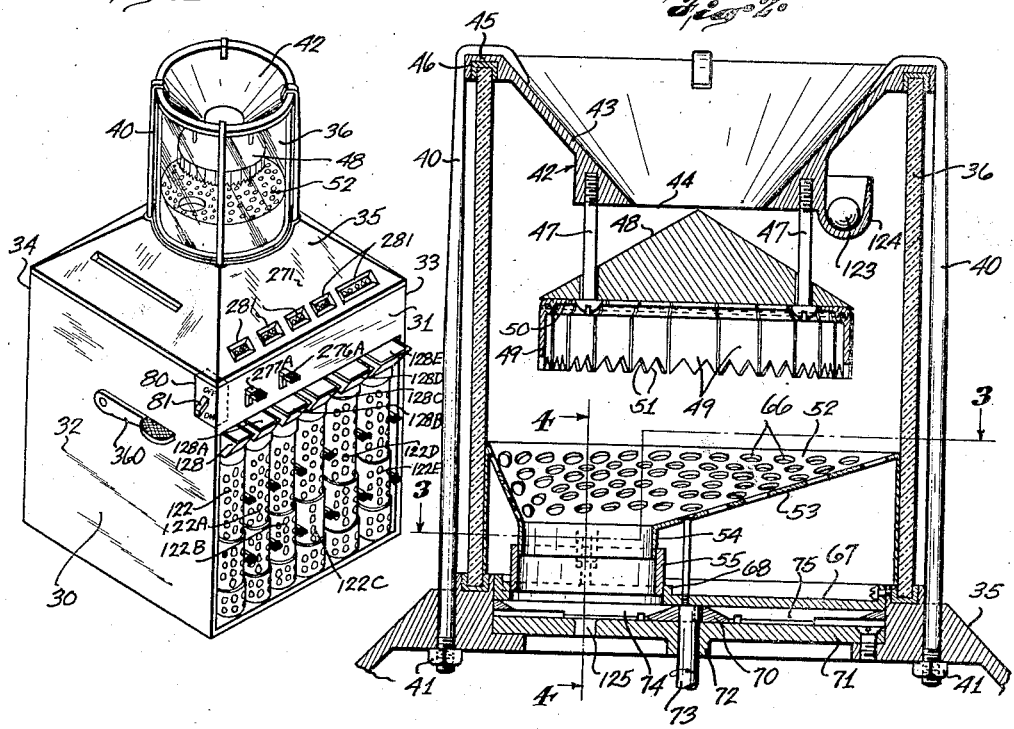
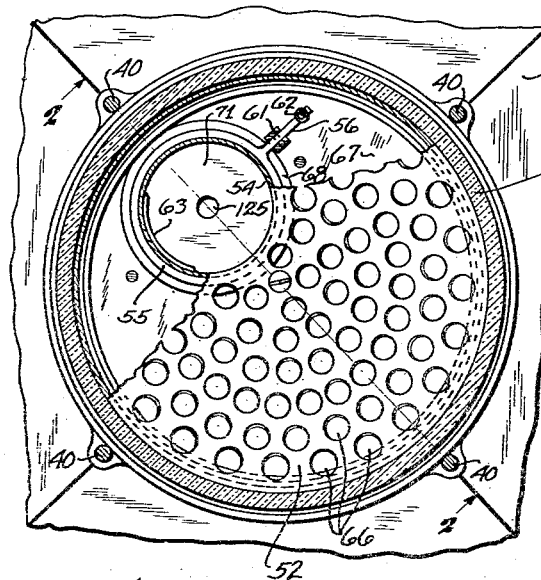
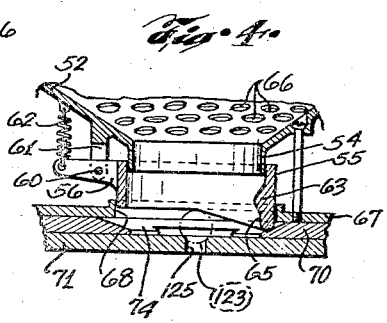
INVENTOR.
FOUNT F. DAUGHERTY
BY
ATTORNEY.

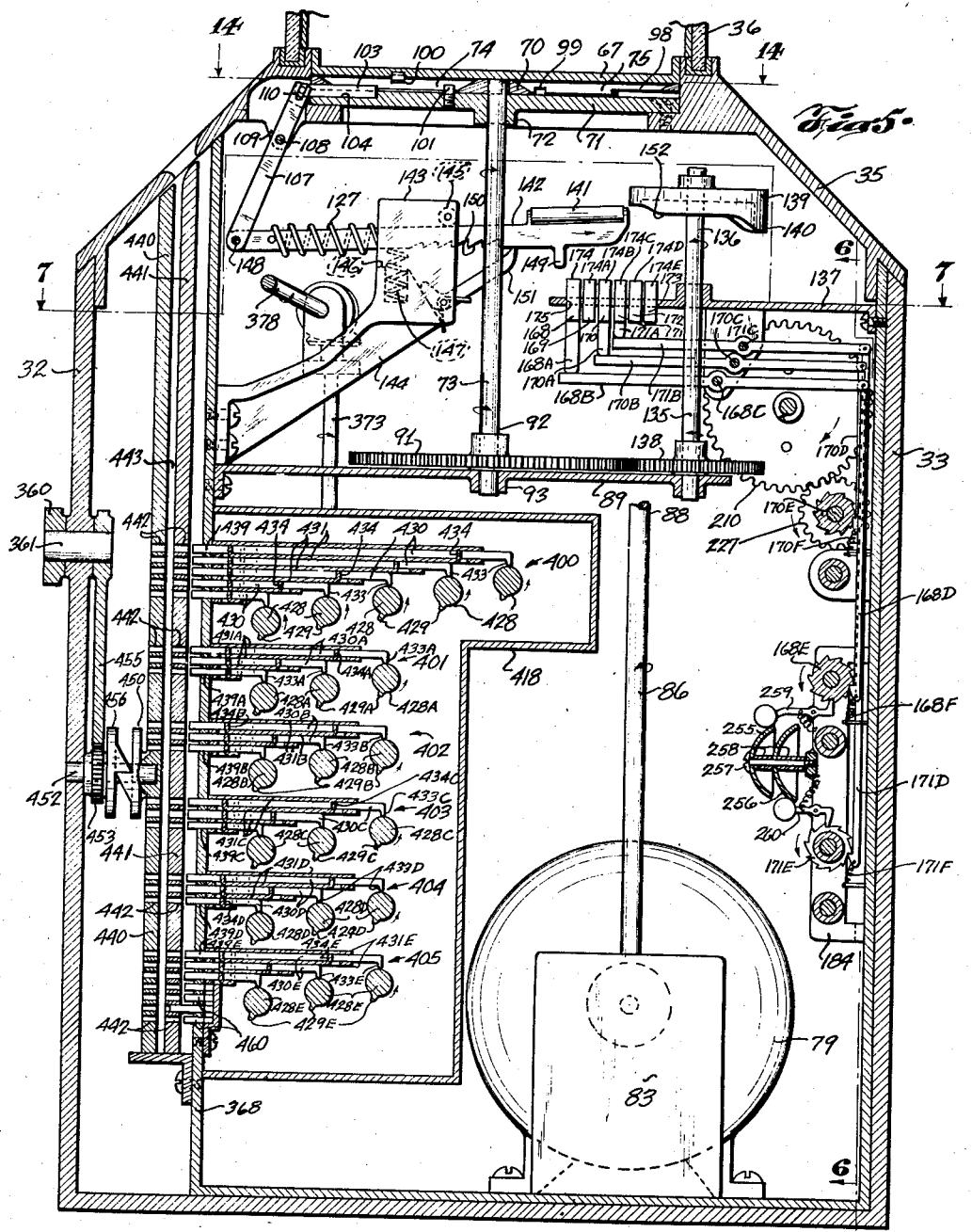

INVENTOR.
FOUNT F. DAUGHERTY
BY
ATTORNEY.

Jan. 4, 1944.    F. F. DAUGHERTY    2,338,575
COIN HANDLING AND TOTALING DEVICE
Filed Jan. 2, 1940    13 Sheets-Sheet 4
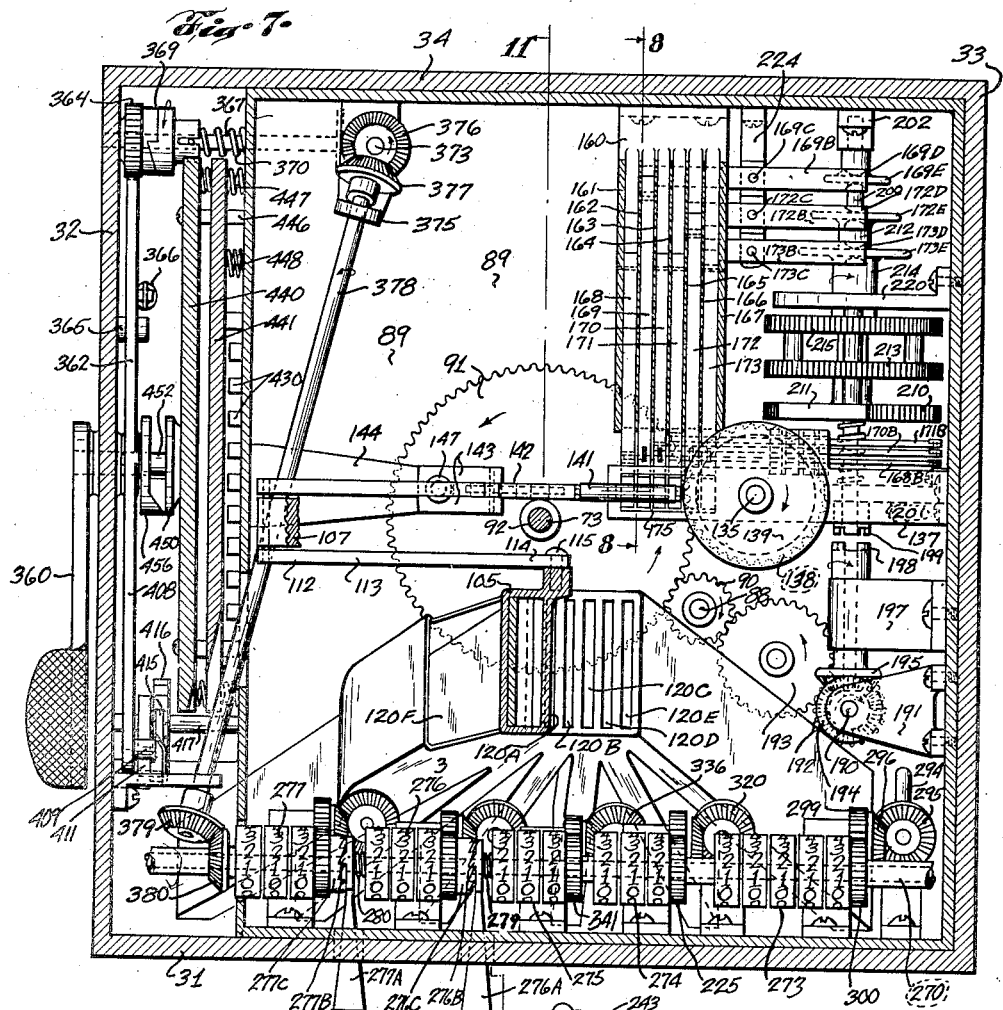
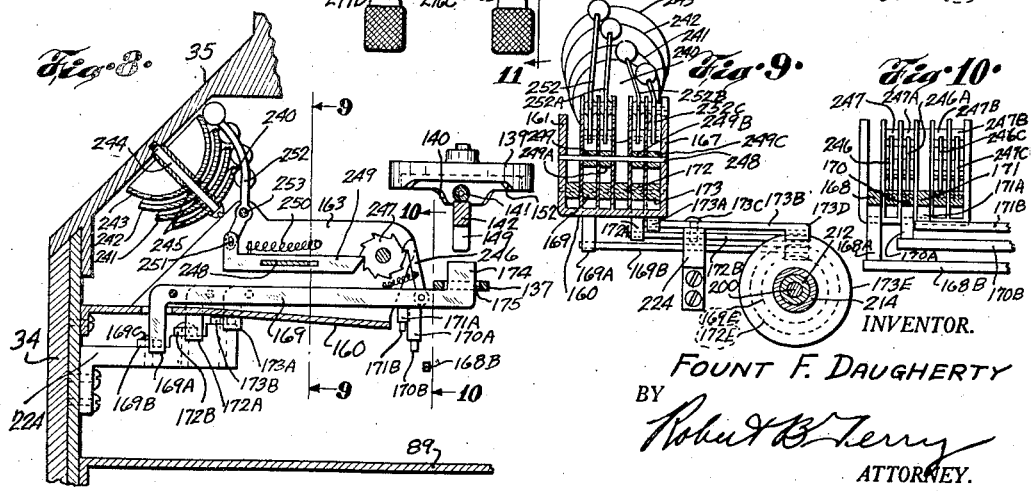
INVENTOR.
FOUNT F. DAUGHERTY
BY
Robert B. Terry
ATTORNEY.

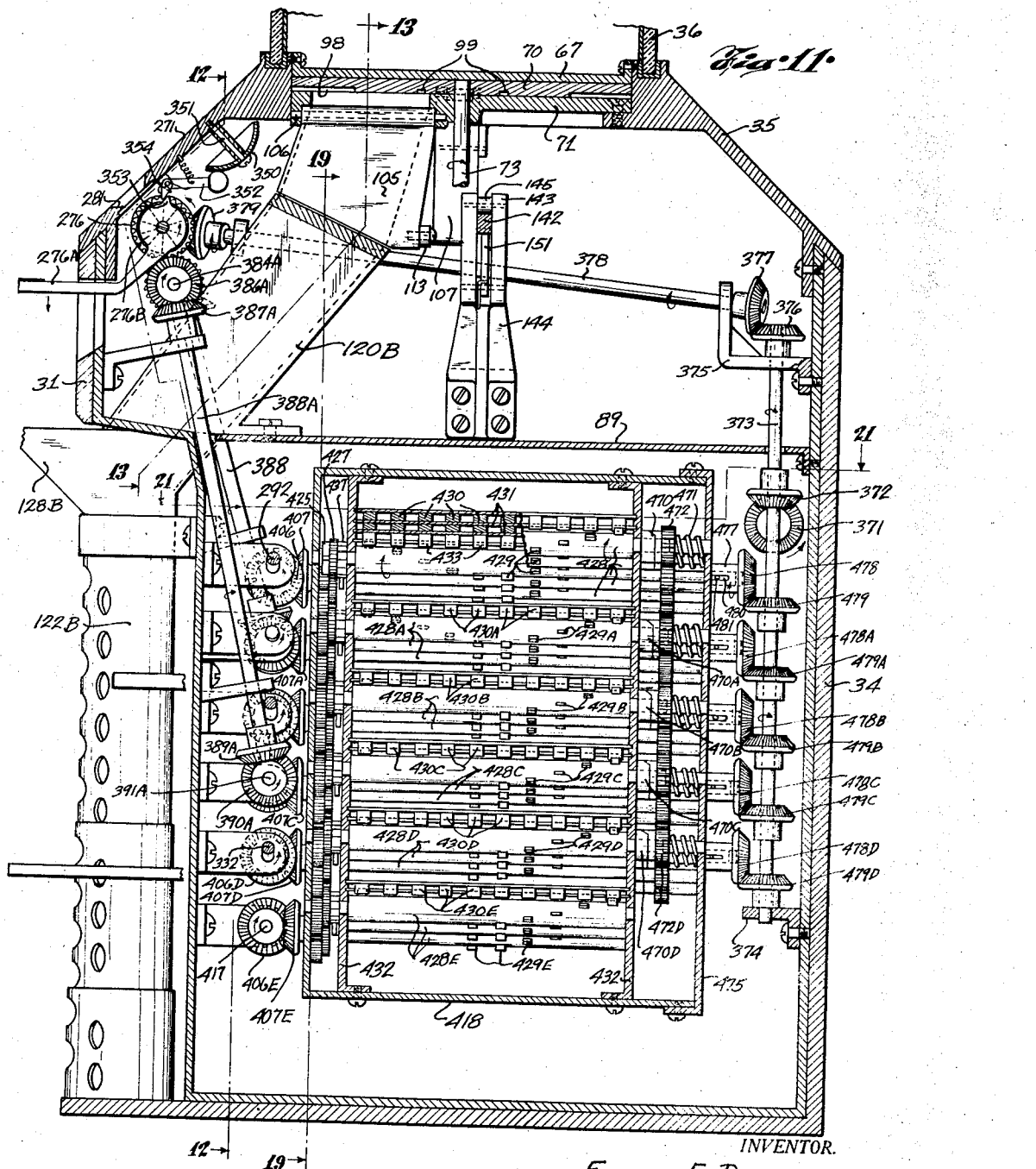

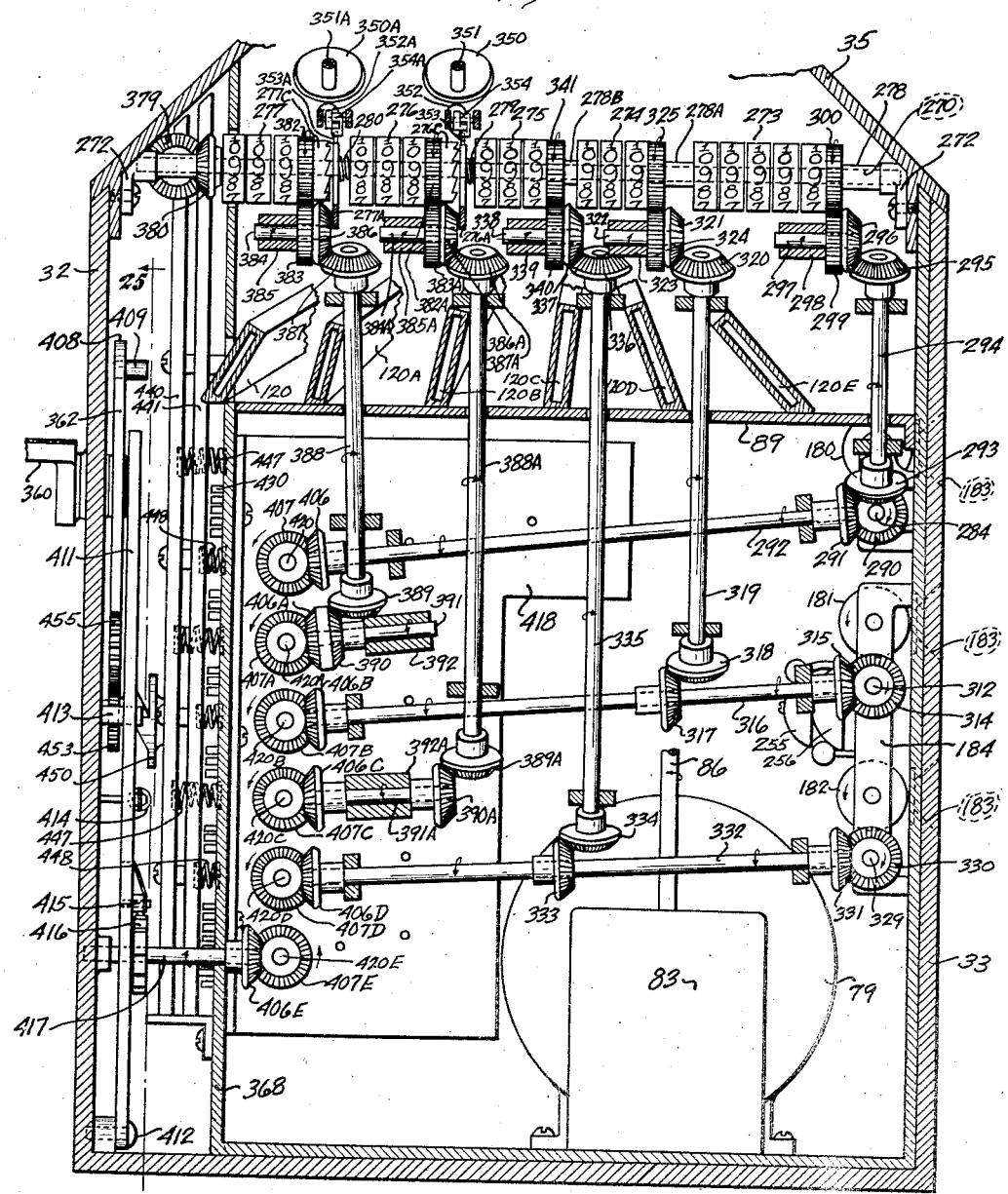

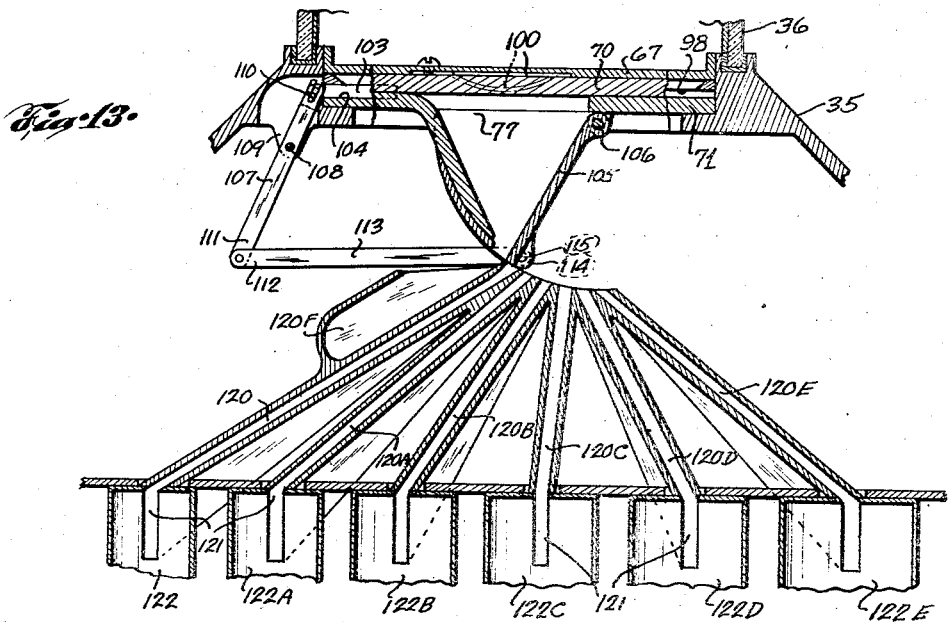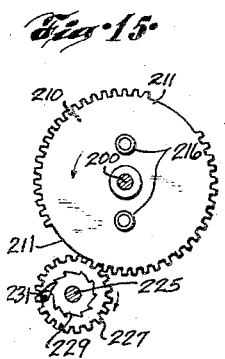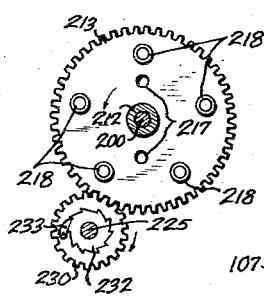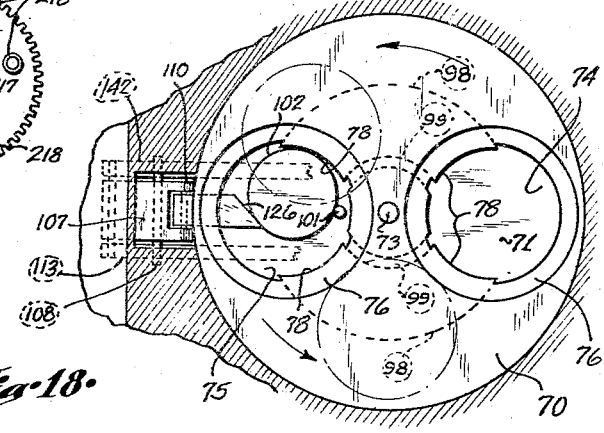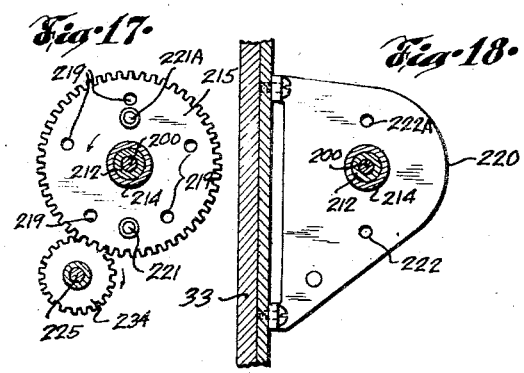

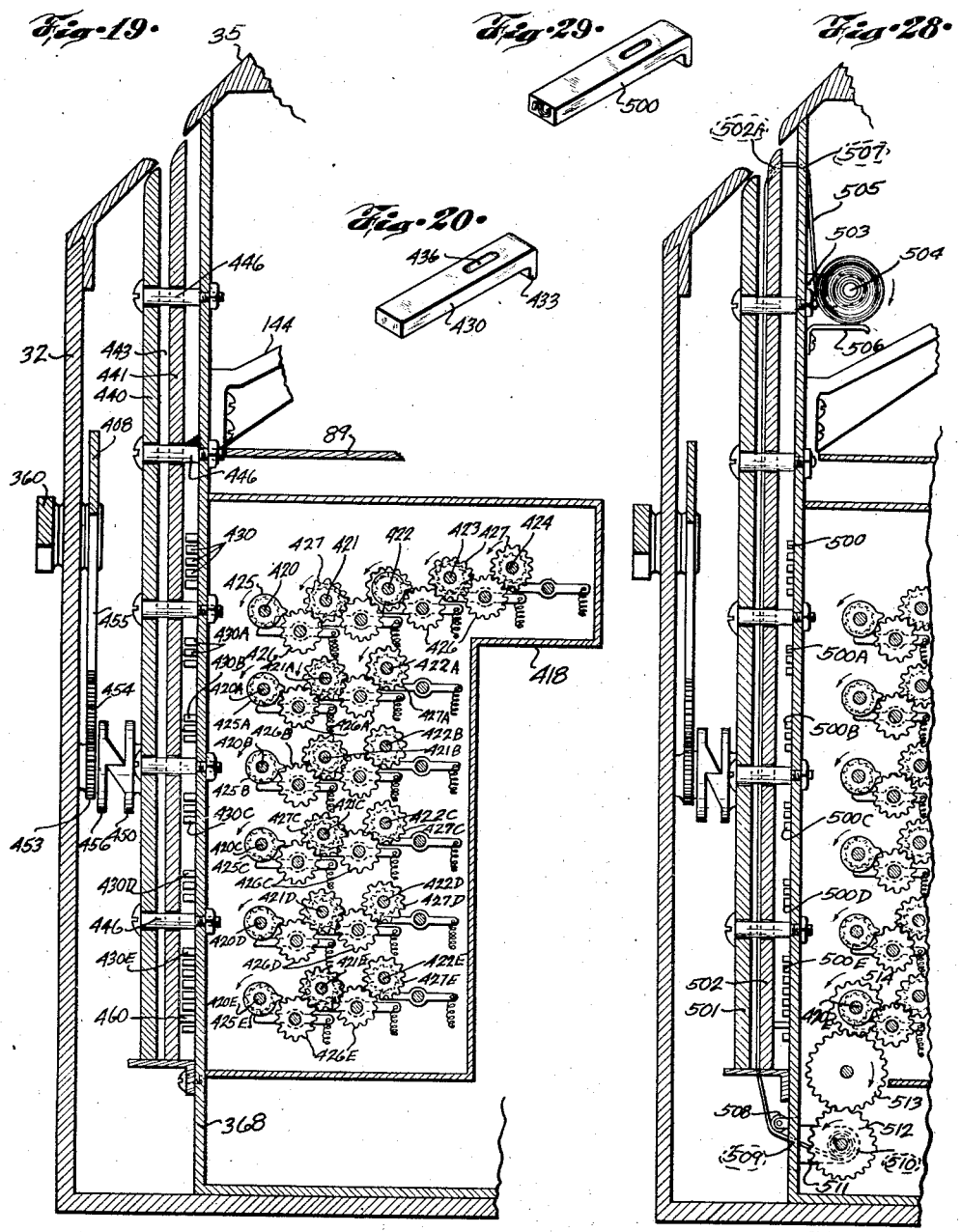

Jan. 4, 1944.  F. F. DAUGHERTY  2,338,575
COIN HANDLING AND TOTALING DEVICE
Filed Jan. 2, 1940  13 Sheets-Sheet 9
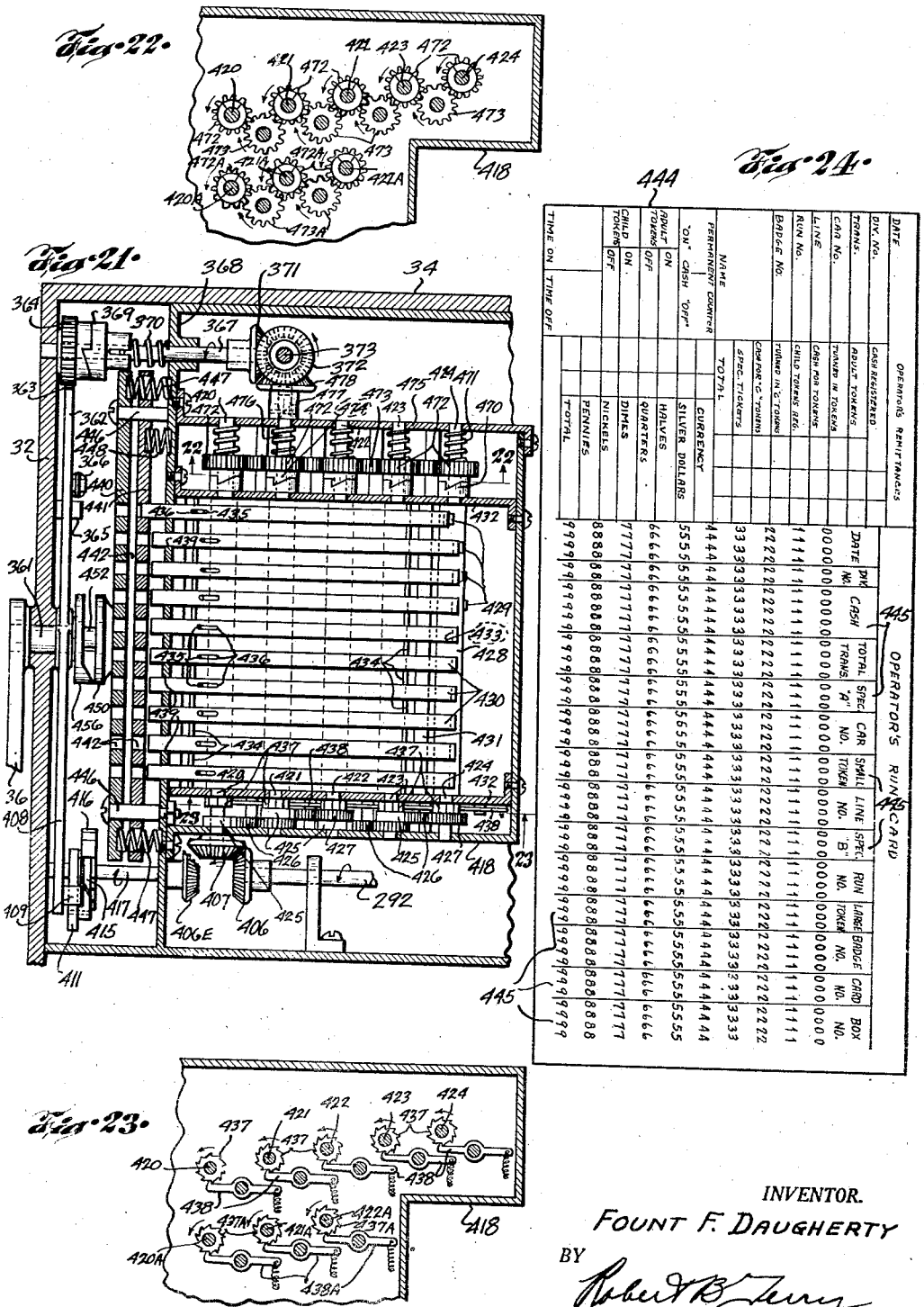
INVENTOR.
FOUNT F. DAUGHERTY
BY
ATTORNEY.

Jan. 4, 1944. F. F. DAUGHERTY 2,338,575
COIN HANDLING AND TOTALING DEVICE
Filed Jan. 2, 1940 13 Sheets-Sheet 10
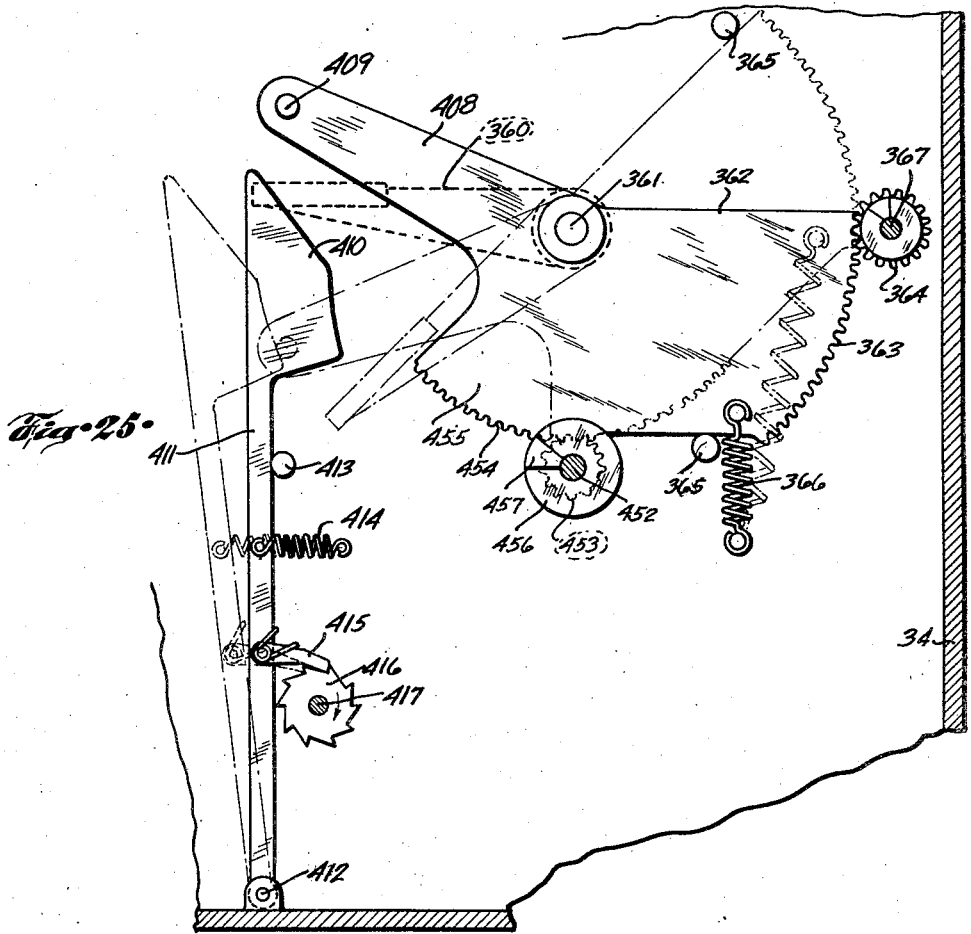
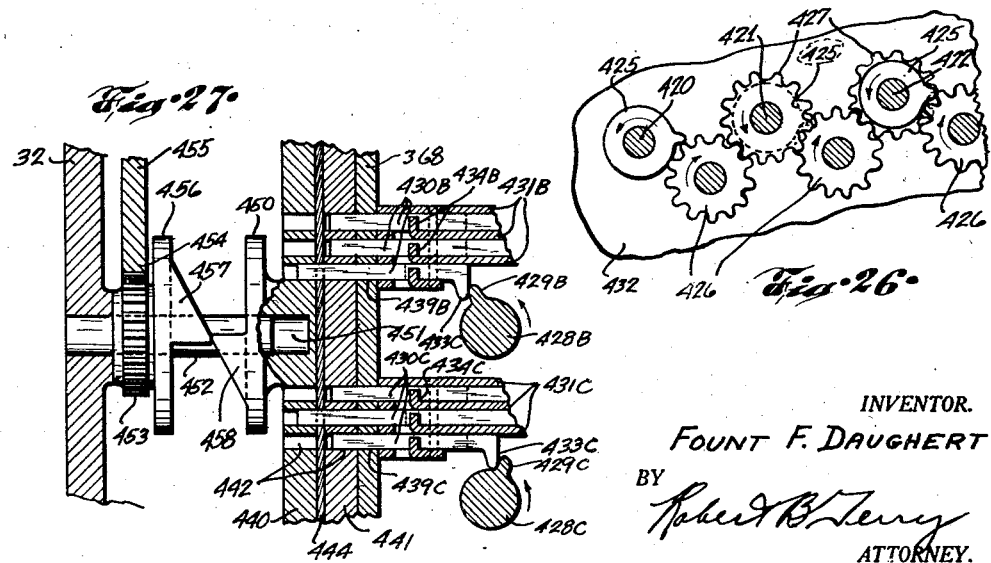
INVENTOR.
FOUNT F. DAUGHERTY
BY
Robert B. Terry
ATTORNEY.

Jan. 4, 1944.  F. F. DAUGHERTY  2,338,575
COIN HANDLING AND TOTALING DEVICE
Filed Jan. 2, 1940  13 Sheets-Sheet 11
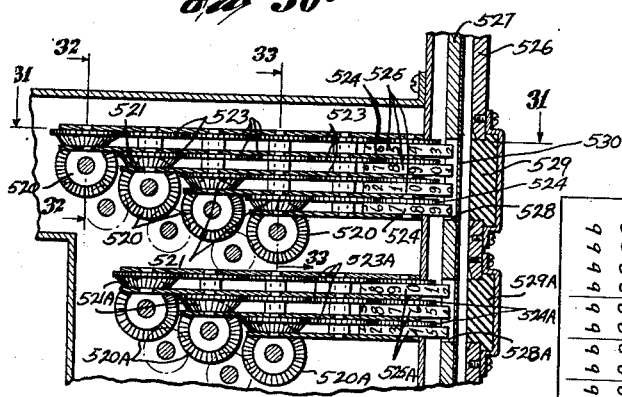
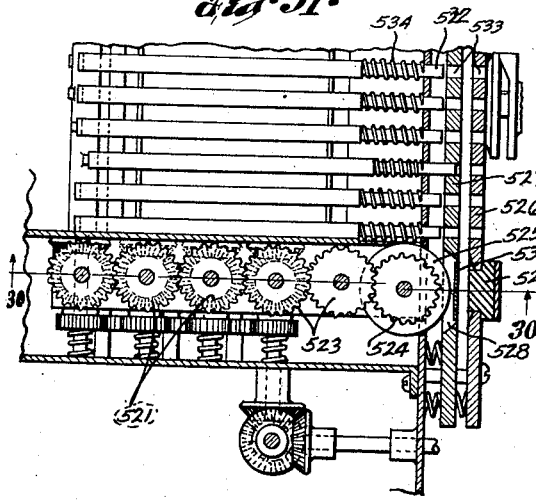
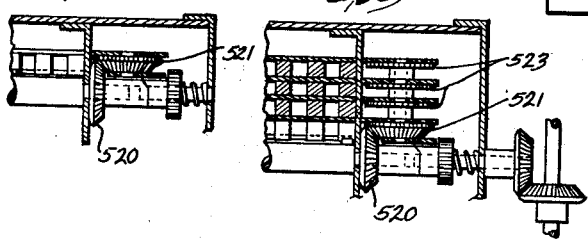
INVENTOR.
FOUNT F. DAUGHERTY
BY
ATTORNEY.

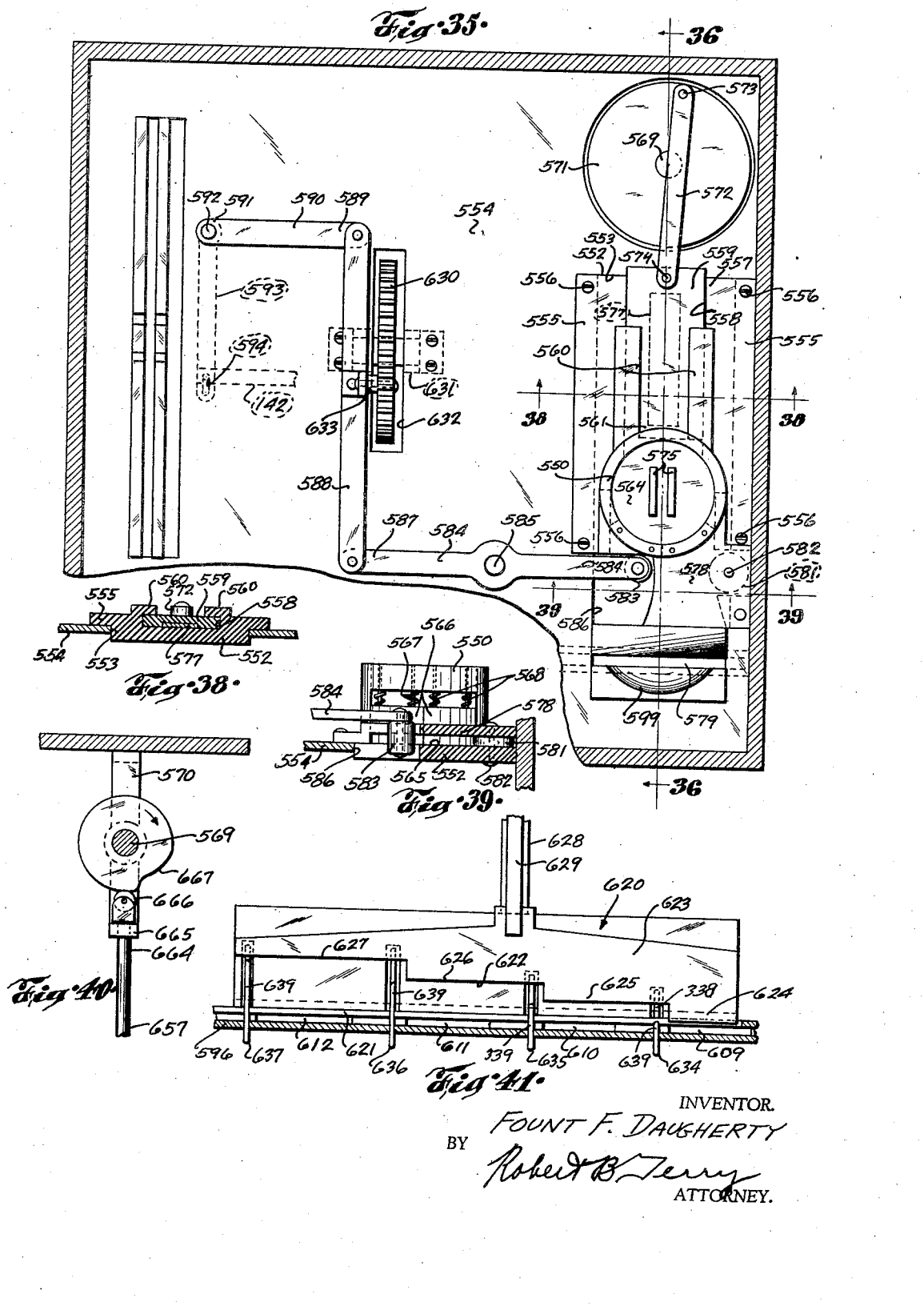

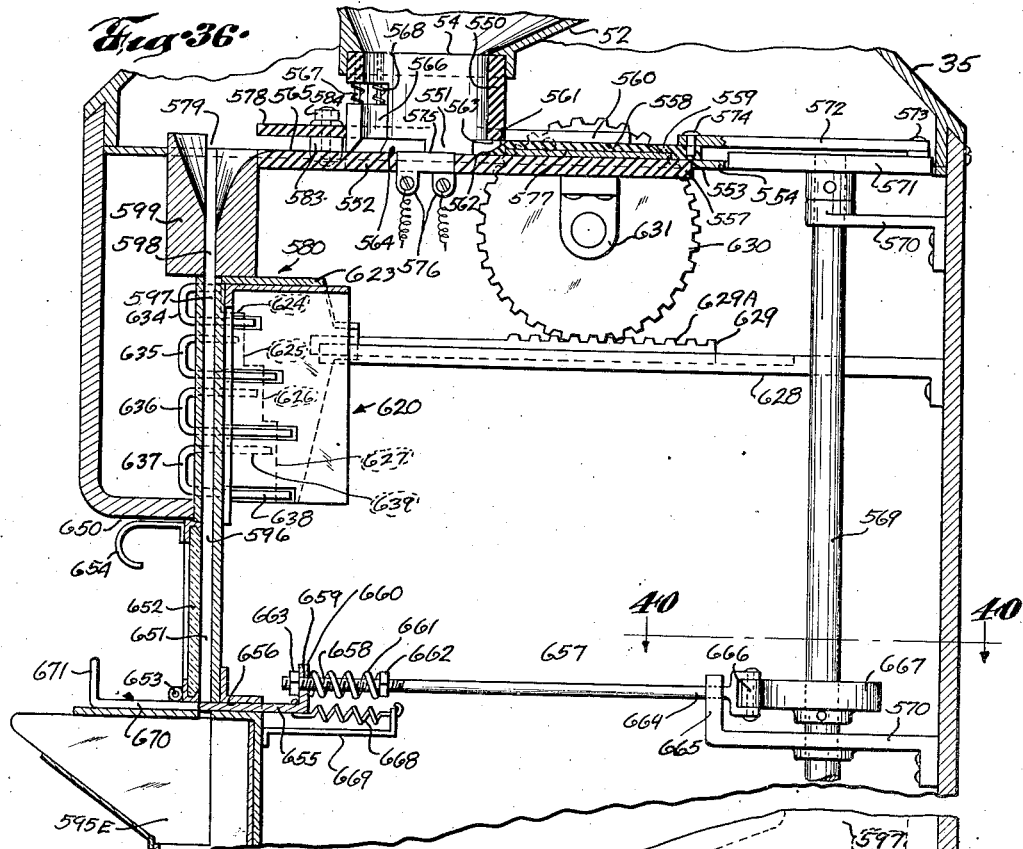
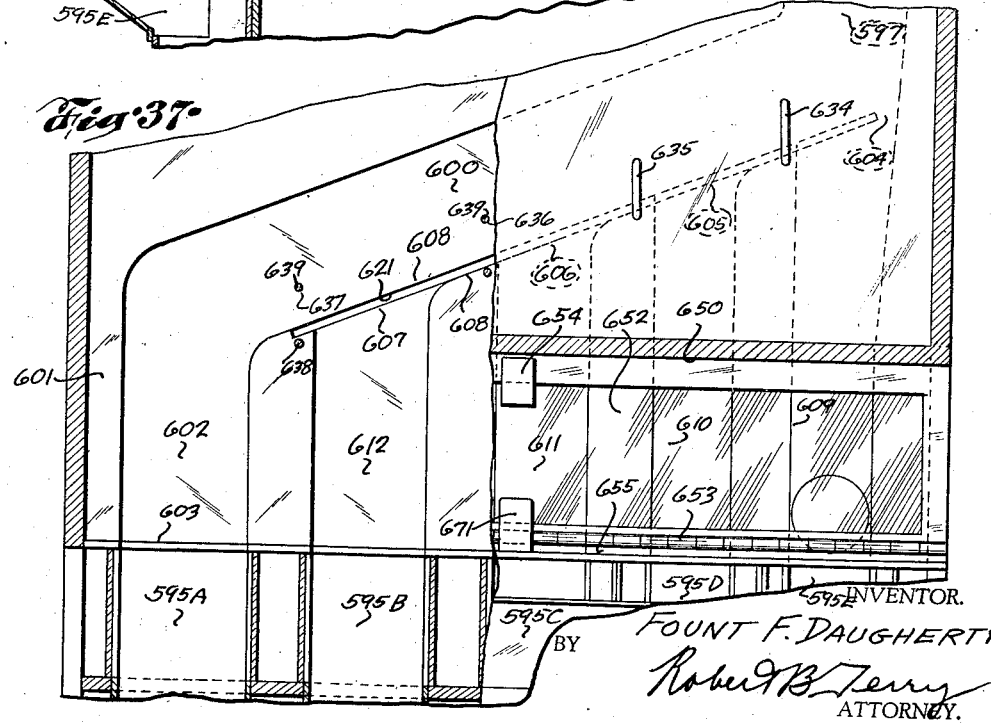

Patented Jan. 4, 1944

2,338,575

UNITED STATES PATENT OFFICE 2,338,575

COIN HANDLING AND TOTALING DEVICE

Fount F. Daugherty, St. Louis, Mo., assignor to Thomas Francis, Fount F. Daugherty, Neal S. Wood, Thomas H. Mize, Idus L. Rhodes, W. J. Moran, Laura P. Carpenter, David R. Francis, all of St. Louis, Mo., and Nathaniel Ewing, Fort Lewis, Wash., as trustees Application January 2, 1940, Serial No. 312,012

12 Claims. (Cl. 235—32)

This invention relates to improvements in coin handling and totaling devices, and more particularly to an improved coin sorting, totaling and recording device adapted for embodiment in a fare box for use on street railways, buses and the like.

The fare box assemblies heretofore prevalently employed for the purpose noted, are manually actuated as far as the counting mechanism is concerned, and indicate only by visible record, the totals of coins of different denominations deposited by fare-paying passengers. These totals are not, as a rule, reset at the end of a run or day, and so require each car conductor or crew to transcribe the totals at the beginning and end of the run, wherefrom is derived, by difference, the trip totals. This prevailing procedure is markedly unsatisfactory for a number of reasons, among which may be noted the requirement of manual actuation; the requirement of calculations to arrive at trip totals or per-man totals, and the consequent high degree to which the personal equation enters into the accuracy of fare tabulation. The major objectives of the present invention are to eliminate each and all of the noted prevailing difficulties.

A further general object of the invention is attained in an improved combination involving a coin-singling and sorting device coordinated with both a total-registering mechanism and a recording device, whereby the conductor is relieved of any necessity of determining, by calculation of any form, the results of his trip or day's run.

With respect to the elements of the combination above stated, it is a major object of this invention to produce an improved coin singling and sorting mechanism susceptible of a variety of uses other than in connection with a fare box assembly as exemplified in the present invention, and further, to provide in one preferred embodiment of the mechanism, as will hereinafter appear, for operator-observation of coins passing through the sorting mechanism and for operator-access to the coins therein so as to facilitate detection and removal of spurious coins inadvertently or otherwise admitted to the fare box.

It is a further object of the invention to produce an improved mechanism for registering, as a dollars-and-cents total, the coin input of the fare box or like device.

Yet another object is attained in an improved cash recording and totaling mechanism which is susceptible of use either in combination with any of the elements aforesaid, or as an independent mechanism, with or without minor changes from the construction disclosed.

Yet another object of the invention consists in the provision of improved power-driven mechanism for the several purposes of singling and sorting coins received in the payment of fares or the like, of operating a registering mechanism for such coins, as well as a mechanism constructed to produce an accurate unalterable written record of receipts. In connection with the improved power-driven mechanism for the several purposes above indicated, the present invention contemplates in one embodiment thereof, control means serving to initiate operation of the power-driven mechanism in response to the introduction of a coin to the coin-singling zone of the machine.

A still further object of the invention consists in a provision of mechanism for the several purposes of registering and recording the fares received during a given trip, run or day, and at the same time maintaining a running total register of all such receipts over a substantial period of time.

An object of relatively less importance than certain of the foregoing is attained in an improved arrangement of signals of audible nature, the attainment of this object being realized in an audible signal denoting the deposit of a coin and indicating the nature or denomination of such coin.

The foregoing objects are not intended as an exhaustive enumeration thereof, since these and many others will clearly appear as the description proceeds, and as considered in view of the accompanying drawings forming a part of this specification, and in which:

Fig. 1 is a vertical elevation in perspective, of the fare box assembly embodying features of the present invention; Fig. 2 is a vertical sectional elevation on a somewhat larger scale than Fig. 1, of the upper or coin receiving section of the fare box assembly, as viewed along line 2—2 of Fig. 3; Fig. 3 is a horizontal section in plan, of the coin receiving section of the box, as viewed from line 3—3 of Fig. 2; Fig. 4 is a fragmentary vertical section in a plane transverse to that of Fig. 2, and as viewed along line 4—4 of Fig. 2; Fig. 5 is a vertical sectional elevation taken through the major portion of the fare box assembly, as viewed from line 5—5 of Fig. 6, and illustrating certain elements of the mechanism by which the coins of different denomination are registered and recorded; Fig. 6 is a vertical sectional elevation in a plane transverse to that of Fig. 5, as viewed along line 6—6 of Fig. 5; Fig. 7 is a horizontal section through the fare box device and looking downwardly therein, as viewed from the stepped line 7—7 of Fig. 5; Fig. 8 is a fragmentary vertical section through an upper portion of the fare box, as viewed from line 8—8 of Fig. 7, the view illustrating certain elements of the coin registering mechanism and audible signalling means; Figs. 9 and 10 are detail elevations, partly in section, of the mechanism shown by Fig. 8, the views being taken respectively, along lines 9—9 and 10—10 of Fig. 8; Fig. 11 is a vertical sectional elevation through the box in a plane parallel to that of Fig. 6, and as viewed from line 11—11 of Fig. 7, the view illustrating certain elements of the coin recording mechanism; Fig. 12 is a vertical sectional elevation in a plane transverse to that of Fig. 11, as viewed along line 12—12 of Fig. 11, and illustrating principally, the operative connection between the coin registering, totaling and recording mechanisms; Fig. 13 is a fragmentary vertical section as viewed from line 13—13 of Fig. 11, and illustrating certain features of the coin singling and sorting mechanism; Fig. 14 is a fragmentary plan view, partly in section, of the coin singling device and coin gauge, the view being taken along line 14—14 of Fig. 5; Figs. 15 through 18 are vertical elevations, partly in section, of different portions of the coin register actuating mechanism, as viewed respectively, from lines 15—15; 16—16; 17—17 and 18—18 of Fig. 6; Fig. 19 is a fragmentary vertical section through a portion of the device, as viewed from line 19—19 of Fig. 11, and illustrating certain of the elements for recording and totaling the fares passing through the device; Fig. 20 is a view in perspective and somewhat enlarged, of a record card punching element utilized in the recording mechanism; Fig. 21 is a fragmentary horizontal section through the box assembly, as viewed along line 21—21 of Fig. 11, and showing elements of the recorder mechanism; Fig. 22 is a fragmentary vertical section through the recorder mechanism of Fig. 21, as viewed from line 22—22 thereof; Fig. 23 is a similar fragmentary section, as viewed along line 23—23 of Fig. 21; Fig. 24 is an elevation of one face of a card adapted to be utilized for recording the totals accumulated in the device; Fig. 25 is a fragmentary vertical section through the device, as viewed along line 25—25 of Fig. 12, and illustrating actuating means for certain elements of the recorder and resetting mechanisms; Fig. 26 is an enlarged, fragmentary elevation, partly in section, of a part of the recorder mechanism, illustrating an accumulator or odometer type of drive for certain elements thereof; Fig. 27 is an enlarged, fragmentary vertical section of a portion of the recorder mechanism, illustrating camming means for actuating certain parts of the recorder; Fig. 28 is a fragmentary vertical section of the recorder mechanism, the view being similar to that of Fig. 19, but illustrating certain modifications in the mechanism to adapt the same for printing the totals accumulated in the device, upon a record card; Fig. 29 illustrates in enlarged perspective, a printing die utilized in the modified recorder of Fig. 28, the element here shown being similar to the punch of Fig. 20, but bearing on its contact face a raised numeral or other character, as the numeral "2," shown; Fig. 30 is a fragmentary, vertical section through a portion of the device in the zone of the recorder mechanism, the view illustrating certain modifications therein and additional apparatus operated by the recorder, for producing a printed record of certain totals accumulated in the recorder; Fig. 31 is a fragmentary horizontal section through the modified device of Fig. 30, as taken along line 31—31 thereof; Figs. 32 and 33 are fragmentary vertical detail sections of the modified device, as taken respectively, along lines 32—32 and 33—33 of Fig. 30; Fig. 34 is an elevation of one face of a card adapted to be utilized in connection with the modified recorder of Fig. 30, for recording the totals accumulated in the device; Fig. 35 is a fragmentary, horizontal section through an upper section of the fare box, illustrating a modified form of coin singling and sorting mechanism; Fig. 36 is a fragmentary vertical sectional elevation, as taken along line 36—36 of Fig. 35, and illustrating details of the modified coin singling and sorting mechanism; Fig. 37 is a fragmentary, vertical elevation taken in a plane transverse to that of Fig. 36, and illustrating details of the modified coin sorting mechanism; Fig. 38 is a fragmentary section transversely through the modified coin singling device of Fig. 35, as viewed along line 38—38 thereof; Fig. 39 is a similar fragmentary section as taken along line 39—39 of Fig. 35; Fig. 40 is a detail elevation of a cam drive for a coin control device shown in Fig. 36, the view taken from line 40—40 of Fig. 36, and Fig. 41 is a detail elevation of a coin sorting control device forming a part of the modification.

By way of general preliminary reference to the assembly as a whole, it is preferred to enclose the parts in a housing indicated generally at 30, and characterized by a front wall 31, so called since it is usually located closest to and facing the operator, side walls 32 and 33 respectively, and a rear wall 34. The housing is conveniently formed of sheet metal of substantial gauge, and is surmounted by a frusto-pyramidal portion 35, serving in turn to carry a cylindrical coin receiver 36. The latter is desirably formed of a heavy glass and is positioned by hooks 40 extended through the housing portion 35 and secured in place by suitable nuts 41. Within the receiver is a coin chute structure 42 characterized by an improved arrangement of its elements to prevent manual access to the interior of the receiver. The chute structure includes an inverted frusto-conical pan 43 projecting downwardly in the coin receiver 36 and provided with an opening 44 in the lower end thereof. The upper end of the pan preferably terminates in an annular flange 45 which is provided with an annular recess 46 in the under surface thereof, to receive the upper margin of the cylinder 36, the flange being held beneath the hooks 40 as shown in Fig. 2. Vertically slidable on headed screws or bolts 47 secured to and depending from the lower end of the pan 43, is a relatively flattened conical member 48 which in its normal position as shown, clears the pan opening 44 sufficiently to allow coins, tokens or the like, to pass therethrough and downwardly in the coin receiver, over the member 48. If for any reason, the fare box assembly is wholly or partly inverted, as in an attempt to remove coins from the receiver 36, the conical member 48 under the action of gravity thereon, will slide toward the pan 43 with its apex portion entering the pan opening 44, thereby effectively closing the opening against outward passage of such coins as may be in the receiver.

A further provision is made in the chute structure, to foil attempts at removal of coins from the receiver while the fare box is in its normal, upright position. Such means comprises a plurality of hinged elements or flaps 49 which normally depend vertically from the periphery of the conical member 48, and are prevented from swinging inward by inwardly directed fingers 50 on the several elements, which abut the undersurface of the member. The lower end of each element is notched or serrated, as shown at 51: Thus in the event coin removal is attempted by the use of gum or other sticky substance on the end of a string or the like, retraction of the gum-caught coin will be effectively arrested by contact of the coin with one or more of the flaps 49, the latter thereby being swung outwardly and upwardly, to span the space between the member 48 and the glass cylinder 36. The notches in the flaps, of course, serve to catch and receive the string in one thereof, so that in the attempt to remove a coin, such coin will be directed toward and into a position underlying the flap engaged by the string.

In the lower portion of the receiver cylinder 36 is a pan 52, the bottom wall 53 of which is sloped to direct the coins toward an open neck 54 thereof. Surrounding and substantially subtending the neck 54 is a camming ring or wiper 55, serving as a continuation of the neck to direct the coins from the pan to the singling plate, later to be described. The annular wiper 55 is best seen in detail in Fig. 4, the annulus being provided with an extension 56 pivoted as by pin 60 engaging a projection 61 on the pan 52. The projection 56 extends beyond the pin 60 to form an arm for receiving a spring 62 anchored also to the pan 52 in a manner to urge the opposite side of the camming ring downwardly, somewhat away from the pan 52, and against a singling disc or coin carrier, to be described. In order to aid in directing a coin received by the pan and ring 55, to a flat position on the singling disc, I prefer to form the ring 55 with one or more projections 63 on its inner surface, such a projection or projections being formed thereon in the zone of a downwardly extending lip 65, the lower margin of which bears against the upper surface of a singling disc 70, later to be described in detail.

As appears in Figs. 2 and 3, the bottom wall 53 of pan 52 is provided with a multiplicity of openings 66 therein, which allow dirt and particles of foreign matter entering the coin receiver 36, to drop therethrough onto a dirt-collecting plate 67 located therebelow. The plate 67 is provided with a circular flanged opening 68, to receive the lower end of the camming ring 55.

*Coin singling and sorting mechanism*

The disc 70 is constructed to rotate in a horizontal plane beneath the plate 67 and overlies a stationary bed plate 71, forming an upper journal 72 for a vertical drive shaft 73, the shaft being secured axially to the disc or plate 70. The disc 70, as best appears from Fig. 14, is provided with a pair of diametrically opposed coin-receiving apertures 74 and 75, these apertures being bevelled inwardly from their upper surface as shown at 76, the bevelled edges tapering inwardly to a thickness of approximately thirty thousandths inch, being about the gauge of a worn ten-cent piece. This precludes, as will appear, the carrying of more than one coin, even though it be of minimum thickness. The arrangement is such that as the coin is deposited in the top of chute 42 and falls into pan 52, it is directed into the ring 55 and falls onto projection 63. It is caused thereby to lie flat in a horizontal plane in the bottom of that one of the disc openings or apertures 74 and 75 which is next brought under and in register with the ring 55. Since the plate 71, except for its coin discharge aperture 77 (Fig. 13), constitutes a bottom for each of the coin-receiving recesses of the disc 70, the coin will be moved in a horizontal plane until it falls or is ejected, as later described, from its position in the singling disc 70. The projection 63 and lip 65 have been so designed and located as a result of numerous experiments, and so coact as practically to assure the deposit of the coin in flat horizontal position in the singling disc. Since the coin is impelled in the disc only by abutment of one of the thin arcuate edges 78 with the edge of the coin, any more than one such coin, even though it be a thin ten cent piece, will be wiped out of the coin seat 74 or 75 by the lip 65 of the spring loaded wiper ring. In this manner the disc and ring coact to prevent the movement of more than one coin at a time, to the position of discharge.

Discussing briefly now the manner of driving the shaft 73, and referring particularly to Figs. 5, 6 and 7, I prefer to utilize an electric motor 79 arranged in the lower portion of the fare box 30, and the operation of which is controlled by a suitable line switch 80 (Fig. 1) having its switch-actuating element 81 accessible from the exterior of the fare box, as shown. The motor is operatively connected to a reduction gear assembly 82 shown in broken lines in Fig. 6, housed in a gear box 83, and the power output element of which is the bevelled pinion 84. The pinion 84 enmeshes with a similar gear or pinion 85 secured to the lower end of a shaft 86 which extends vertically above the gear housing (Fig. 5), the lower end of the shaft 86 being suitably journalled within the gear box, as at 87. The upper end 88 (Fig. 7) of the shaft 86 is suitably journalled (not shown) in a horizontal plate 89 (Fig. 5) forming a part of the fare box frame, and projects thereabove to provide for connection of a drive pinion 90 thereto, as shown in Fig. 7. This element enmeshes with a relatively large diameter gear wheel 91 operatively secured to the lower end 92 of the shaft 73, to effect the drive therefor. As appears in Fig. 5, the shaft 73 at its lower end 92, is journalled in the frame plate 89 at 93.

Referring further to the action of the coin as it is brought into one of the recesses in the singling disc 70, the projection 63 internally of the ring 55 and in the zone of the downwardly projecting lip 65 thereof, has the effect of camming the coin downwardly into a horizontal position, in case it has not originally assumed such a position. The coin, having been deposited in one of the singling disc openings, say 74 (Figs. 2, 3 and 14), when such opening registers with the ring 55, will be carried by rotation of disc 70, to the position occupied by the opening or recess 75 as shown in Fig. 14, at which position is located a coin-gauge presently to be described. Beyond the latter position, the coin will be edgewise presented beneath a bow spring 100 appearing in Fig. 13, the coin having been moved in the direction shown by the arrow (Fig. 14) to the position of the discharge post 77. As best appears from Fig. 13, the bow spring is carried by the upper deck plate 67 in a position to overlie the discharge port 77, such that the coin in engaging the same, is turned edgewise into the chute therefor, hereinafter described. During its displacement by the disc 70, the coin or token, the terms herein being employed interchangeably, will engage on its periphery, a non-yieldable stop 101 (Fig. 5) carried by and projecting upwardly from the plate 71. The opposite peripheral portion of the coin 102 will be brought to bear against a movable gauge element 103 which is displaced a greater or less distance outwardly of the axis of the disc, according to the diameter of the coin. According to the present exemplary disclosure and as best appears from Figs. 5, 11, 13 and 14, the rotary disc 70 is annularly undercut as at 98, in order that the disc may clear the gauge element 103 and so that an edge of a coin may engage the element 103 to actuate the same for a purpose presently to appear. Further, the disc 70 in the hub zone thereof, is provided with arcuate slots or grooves 99 to accommodate the fixed stop 101 upstanding on plate 71 opposite the gauge 103 (Fig. 14), as the disc rotates. The position of stop 101 is such that it will be exposed for engagement by a coin in one of the openings 74 and 75 in disc 70, as one or the other of the openings approaches the zone of the stop and gauge 103, as this is illustrated in Fig. 14. A vertical side elevation of the movable gauge 103 is shown by Figs. 5 and 13, and it is constrained to a straight-line lateral movement by a guide recess 104 formed in the bed plate 71 to receive the gauge. The gauge 103 is connected to a movable coin chute 105 swingably mounted about a pivot 106, the connection being made through a linkage assembly including a lever 107 pivoted intermediate its ends, about a pin 108 carried by lugs 109 formed internally of the housing 30. The upper end of the lever 107 is operatively associated with the gauge 103 through the pin and slot connection 110 as shown, such that the translatory movement of the gauge will result in pivotal movement of the lever. To the lower end 111 of the lever and on one side thereof, is pivotally connected one end 112 of a link element 113, the opposite end 114 of the latter being in turn, pivotally connected as at 115, to the swingable chute 105, as best appears in Fig. 7. The foregoing pivotal connection is effective so as freely to translate the straight line movement of the gauge to an arcuate movement of the coin chute.

The path of the chute 105 is such that its discharge or delivery end may be brought selectively into register with the receiving ends of the fixed coin chutes 120, 120A, 120B, 120C, 120D, 120E, and of a somewhat enlarged chamber or pocket 120F located externally of and immediately beyond the chute 120, and provided for receiving any object smaller in diameter than the smallest coin or token received in the fare box. The chutes numbered 120, 120E which are of rectangular transverse section as will appear in Figs. 7 and 13, are directed downwardly and toward the front wall 31 of the housing 30, such that the lower open ends thereof may register with coin-receiving openings 121 in corresponding magazines 122—122E (Figs. 1 and 13) of a preferably detachable money changer.

From the foregoing it will appear that the movable chute 105 is positioned by movement of the coin gauge to discharge above the fixed chute approximate to receive such coin, the chute 120 being utilized, for example, for small tokens, 120A for dimes, 120B for pennies, 120C for large tokens, 120D for five cent pieces and 120E for quarters. The exact number of the fixed chutes and magazines will depend upon the particular requirements of service.

In the use of fare boxes in public carrier vehicles, attempts are not infrequently made by unscrupulous employees to remove coins by inversion of the box. This has been referred to hereinbefore, in connection with the adaptation of the chute structure 42 in the coin receiver 36, to prevent the removal of coins in such manner. However, an additional device for thwarting such attempts is embodied in a safety ball 123, normally retained in a pocket 124 therefor, carried by the chute 42. In case the box is tilted beyond a critical angle, the ball falls from the holder 124, and thereafter to a position in one of the recesses of the singling disc (Fig. 4), and so prevents any additional coins passing through the disc until the ball is restored to the pocket. The relative sizes of the ball and apertures 74—75, as well as aperture 125 in the bed plate, are such that the ball will never pass below the plane of the bed plate. The arrangement described enables the certain detection of any attempted removal of coins by inversion or tilting of the fare box.

To summarize the action of the coin singling and sorting mechanism, it will now appear, for example, that a coin of the largest contemplated diameter, say a 25¢ piece, when received in the singling element 70 and as displaced thereby, will first encounter the coin gauge 103 by abutment of a bevelled or camming surface 126 thereof and will continue to displace the element 103 until it occupies the outermost limit of its movement. By reason of such extreme range of gauge movement, the delivery end of chute 105 will have moved through its greatest range, or to a position opposite the chute 120E. After the coin has cleared the gauge and has been delivered through the chute 105, the gauge is returned to its initial position shown in Fig. 14, this return movement being effected by a spring 127 (Fig. 5) which is operatively associated with the gauge as well as other apparatus controlled by the gauge, later to be described. As will more fully appear hereinafter, the action of the spring 127 in returning the gauge, as well as the chute 105, to initial position, is delayed for a predetermined time following coin-positionment of the gauge, so that the chute 105 may be retained in gauge-actuated position at least until the coin has been delivered therethrough. It is to be noted here and as clearly appears in Fig. 13, that when the gauge is disposed in its initial position, the delivery end of the coin chute 105 will be thereby positioned in register with the receiving end of the chamber or pocket 120F. Hence, upon the introduction of a coin or other objects, as a button, smaller in size or diameter than the smallest coin or token to be received and sorted by the device, such object will not displace the gauge, but will be delivered directly into the chute and thence pass into the chamber 120F, for later removal.

It will have been observed that the device as thus far described is completely operative, irrespective of other elements, for the purpose of singling the coins, carrying them in flat singled relation, and discharging them, each into its appropriate receiver or magazine of the changer 122. The changer 122 may be of conventional form, such that the several coin magazines are each provided with a coin-receiving mouth or chute numbered 128, 128A through 128E, accessible externally of the fare box for direct insertion of coins in the money changer.

Registering mechanism

The device as constructed preferably embodies mechanism for counting or registering the coins deposited in the fare box. By further preference the mechanism includes total counters as well as per-man counters, the latter having reference to a device capable of being reset at will, and serving for the accumulation of cash totals for each run, each day, or each man, as may be desired. The assembly by which this result is accomplished is best shown by Figs. 5, 6 and 7, and is actuated by means of the drive pinion 90 on the shaft 86, rotated, as heretofore described, through the agency of motor 79. A shaft 135 parallel to shaft 73, is journalled at its lower end in the frame plate 89, and is similarly journalled somewhat below its upper end 136, in a frame bracket 137 projecting inwardly from the housing wall 33. Secured to the shaft 135 is a gear 138 which enmeshes with the gear 91 on shaft 73, the shaft 135 thereby being rotated in timed relation with shaft 73 for a purpose which will become apparent as the description proceeds. Secured to the upper end 136 of shaft 135 is a cam 139 in the form of an inverted cupped element characterized by a projection 140 in the form of a depending lip or flange on the cam. As a follower for the cam 139, there is utilized a roller 141 pivoted between trunnions therefor on an arm 142. This arm is yieldably positioned, to permit up and down movement, the arm for this purpose being projected horizontally between spaced portions 143 of a frame bracket 144. Limiting upward movement of the arm is a roller 145 spanning the bracket portions 143, while downward movement of the arm is arrested by a bracket abutment 146. A coiled spring 147 carried by the bracket, engages the arm and serves to urge the arm upwardly against the roller 145. The arm 142 further is pivotally connected, as at 148, to the lever 107 of the coin gauge mechanism heretofore described, the arm being retracted to the position shown in Fig. 5, by the compression spring 127 mentioned hereinbefore. Thus the arm 142 is connected for actuation by the coin gauge 103, while the spring 127 serves both to retract the arm 142 and to position the coin gauge 103 in its initial position, the latter function of the spring relative to the gauge being heretofore indicated. From this it will appear that as the gauge 103 is moved toward the outer wall of the case, the lower end of lever 107 is moved in an opposite direction or to the right (Fig. 5), as is the arm 142. The normal retracted position of the arm or slide 142 under influence of spring 127, is such that the follower roller 141 is positioned adjacently to but out of engagement with the camming surface of the element 139. When, however, the slide 142 is moved to the right (Fig. 5), the roller is brought within the path of the high point of the cam, and when this high point or nose 140 engages the roller, it will depress the slide 142 against the loading of spring 147. Near the outer end of slide 142 and depending therefrom, is a projection or nose 149, and the under surface of the slide is provided with notches or teeth 150, adapted for selective engagement with a pivoted, spring-pressed pawl 151 carried by the bracket 144 and arranged to retain the slide in its coin set position while depressed by the cam 139 and until released by the cam 139. As a preliminary movement of the follower and slide is effected by the engagement of a first or lesser step 152 of the cam 139, the first action of the cam will cause engagement of the pawl 151 with one of the notches 150, to establish a definite longitudinal placement of the slide. The second downward movement of the slide by the projection or nose 140, is utilized to actuate the counter mechanism, as later described. From the foregoing, it will be readily observed now, that following coin-positionment of the gauge 103 to properly position the coin chute 105 and the arm or slide 142, the cam 139 acts to depress slide 142 for engagement by the pawl 151. The latter element retains the slide, and hence the gauge and chute elements, in actuated position during the operation of the cam on the slide in the coin-registering cycle presently to be described, after which the cam releases the slide so that spring 147 may then raise the slide out of held-engagement with the pawl 151. Thereupon, the spring 127 acts to return the slide, gauge and chute to their initial positions. The operations of the cam 139 and coin-displacing disc 70 are so correlated that during the operation of the cam on the slide in the coin-registering cycle, and while the slide, gauge and chute 105 are retained in actuated positions through pawl 151, the disc 70 displaces a coin from the zone of the gauge, toward and into the opening 77. Such coin then is discharged through the chute 105 into the proper one of the coin-channels or chutes 120—120E. Prior to the disc-displacement of a succeeding coin to the zone of the gauge 103, the cam 139 will have released the slide 142, to permit the return of the slide, gauge and chute 105 to initial positions in the manner described.

As best appears in Figs. 7 and 8 a frame-bracket 160 projecting horizontally from the housing wall 34 and inwardly toward the bracket 137, is formed to provide a plurality of parallel vertical wall elements extending longitudinally of the bracket and being substantially equally spaced. In the present structure, there are seven such spaced walls, numbered 161, 162, 163, 164, 165, 166 and 167, each adjacent pair thereof serving to form a locating slot or chamber for one of a plurality of levers or rods 168, 169, 170, 171, 172, and 173, extending horizontally therein and each projecting an equal distance beyond the bracket 160, to underlie the bracket 137. The ends of the rods which underlie bracket 137, are provided with upstanding elements or fingers, as the fingers 174, 174A, 174B, 174C, 174D and 174E, which project upwardly through a slot 175 provided therefor in the bracket 137, the upper ends of the fingers thereby being presented for selective impingement by the nose or projection 149 of the slide 142. As will appear from Fig. 7, the rods 168, 170 and 171 are of substantially equal lengths, while the remaining rods are of various lengths, as shown, and all the rods are pivotally secured near their inner ends, to the bracket walls 161—167. Thus the rods are severally mounted for a limited pivotal movement, being limited by the brackets 137 and 160 as best appears in Fig. 8. It will have appeared from the preceding action of the coin gauge 103, that this element serves selectively to place the slide 142 with its nose 149 over a selected one of the rod fingers 174—174E, so that as the element 142 is depressed by the nose of cam 139, one and one only of the rods 168—173, will be pivotally actuated. For the purpose of retracting the several rods to initial position such that each abuts the under surface of the bracket 137, as indicated in Fig. 8, suitable return springs are associated with rod-actuated elements operatively related to the rods, as will hereinafter appear.

The counters of the registering mechanism include in the present example and as best appear in Figs. 5 and 6, a cash total counter designated generally as 180, below which are located totaling token counters, the one thereof designated at 181, being utilized, say, for small tokens, and the companion 182 for large tokens. Each of these counter units may consist of a usual assembly of laterally contiguous coaxial annular elements, each bearing numerals from zero through 9 as shown, and in each group, the numeral-bearing elements being operatively associated in decimal driving ratio in accordance with the well-known construction of odometers and other totaling devices. The specific arrangement of the elements of each counter is regarded as well known in the art and requiring no present detailed description. It is to be noted here that in the present example, the cash and token counter assemblies 180, 181 and 182 are preferably non-resettable, that is a subsequent initial or zero setting of each is attained only after the maximum number of units receivable by the counters, have been registered thereon. As will hereinafter appear, additional resettable counter assemblies operated by and simultaneously with the above non-resettable counters, are provided for per man or per day totals. Furthermore, the present cash counter 180 is adapted for totaling registry of all cash units passing through the machine, as pennies, dimes and quarters, through appropriate actuating mechanism therefor, presently to be described.

The several counters above indicated are rendered visible for reading, through windows 183 indicated in broken lines in the side wall 33 of the housing (Fig. 12), these windows being of sufficient height or width to enable ready observation of the total on each counter, as viewed from the outside of the casing or box.

The token counters 181 and 182 are supported by spaced brackets 184 common thereto, and which provide also, for the support of further elements of the registering mechanism, as drive means for connecting each token counter to a corresponding but resettable token counter later to be described. In a similar manner, the totaling cash counter 180 is supported by brackets 185, which brackets likewise provide for the support of drive means connecting the counter to a corresponding but resettable cash counter to be described hereinafter.

Referring now to the connection between the rods 168—173, and the associated counters 180, 181, and 182, it is seen that depending fingers on certain of the rods, each engages one end of a lever, the several such fingers, levers and related elements to be described, being numbered correspondingly to the associated rod, but bearing consecutive letter suffixes. Selecting as an example, the pivoted rod 168 and its depending finger 168A in engagement with the inner end of a lever 168B, this lever is pivoted at 168C to a stationary bracket therefor, and pivotally supports at its opposite end, a depending ratchet element 168D. The latter constitutes a pawl and operates in conjunction with a toothed periphery of a disc 168E, the pawl being urged into engagement with the disc through the agency of a spring 168F; the spring 168F serves also to load the rod 168 through the lever and pawl connection, in a manner to urge the rod to its initial position, as hereinbefore indicated. From the relation of parts in Figs. 5 and 6, it will be seen that a downward pivotal movement of rod 168 will result in an upward movement of the pawl 168D a distance to move the disc 168E through an angle corresponding to one tooth, this space also corresponding to the spacing of one numeral on the counter assembly. In the impelling connection selected for description, the elements serve to actuate the small token counter 181.

The foregoing description of the elements connecting the rod 168 and the small token counter 181 to be actuated thereby, is applicable equally, utilizing distinguishing numerals but corresponding suffix letters, to the large token counting arrangement 182, as from rod 171, and to that for the cash total counter 180 which operates through the rod 170, to register the passage of one cent pieces, or pennies, through the machine. As hereinbefore indicated, the cash counter assembly 180 is provided also, for registering nickels, dimes and quarters, as well as pennies, the arrangement for actuating the counter being somewhat different, however, in the case of nickels, dimes and quarters, than the described arrangement operated incident to the passage of pennies through the machine. The counter actuating means for the coins of larger denomination will be now described.

Referring in particular to Figs. 6 and 7, the motor 79 serves to drive, through the drive pinion 90 heretofore described, a vertical stub shaft 190 rotatively supported by the bracket 89 and a bracket 191, the stub shaft having secured thereto a pinion 192 which enmeshes with an intermediate gear wheel 193, the latter in turn enmeshing with the drive pinion 90. Also operatively secured to shaft 190 is a bevelled pinion 194 which engages a similar bevelled pinion 195 on one end of a horizontal shaft element 196, the latter being rotatively journalled in a bracket 197. The opposite end 198 of the shaft element 196 is adapted as one element of a toothed or dog clutch, the mating element 199 of which is secured to one end of a horizontal shaft 200. The shaft 200 carrying the clutch member 199, is journalled for rotative as well as axially slidable movement, in brackets 201 projecting inwardly from the housing wall 33, and 202 on the housing rear wall 34.

Secured or pinned to the shaft 200 intermediate the shaft supporting brackets 201 and 202, and located near the former, is a gear wheel 210 which is incomplete, since portions 211 of its toothed periphery are devoid of gear teeth (Fig. 15) for a purpose later to appear. A tubular shaft 212 is sleeved on the shaft 200 and carries on one shouldered end, a gear wheel 213 preferably freely journalled thereon. A second tubular shaft 214 is sleeved upon the sleeve shaft 212 (Fig. 6), and has freely journalled on one shouldered end thereof, a gear wheel 215. The gear 210 is releasably connectable to the gear 213 by means of a pair of laterally projecting, diametrally opposed shouldered pins 216 secured to gear 210 and each engageable in one of a pair of registering apertures 217 in the gear 213. In a similar manner, the gear 213 is releasably connectable to the gear 215, distinguishing from the first described connection, however, in that five shouldered pins 218 are carried by gear 213 and are equally angularly spaced as appears in Fig. 16. Each of the latter pins is engageable in one of five correspondingly spaced apertures 219 in one face of the gear 215 (Fig. 17). Again and in a somewhat similar manner, the gear 215 is releasably connectable to a fixed bracket 220 which projects inwardly and in a vertical plane, from the housing side wall 33 (Figs. 6, 7 and 18). As appears in Fig. 6, the bracket 220 is apertured to receive therethrough, the shaft elements 200, 212 and 214. Secured to gear 215 are two shouldered pins 221 and 221A which project laterally therefrom and are diametrically opposed (Fig. 17), the pins however, being located such that the pin 221 is further removed in the radial direction from the gear axis, than the pin 221A. Similarly located apertures 222 and 222A in the bracket 220, serve to receive the pins 221—221A, the arrangement being such as will now appear, that the aperture 222 will receive only the pin 221, while the aperture 222A receives only the pin 221A. As appears in Fig. 6, the several gears 210, 213 and 215 are of equal diameter for a purpose which will become evident from the description hereinafter, of the function of the gear assembly.

The initial position of the shaft and gear assembly above described, is shown in Fig. 6 and is effected by a compression spring 223 sleeved on shaft 200 and bearing at one end, against the bracket 201 and at its opposite end, against the gear 210. In such position, the gear elements are pinned together, and through the pins on gear 215, to the bracket 220, while the shaft 200 thus retracted, as to the right in Fig. 6, disengages the clutch element 199 thereon, from the clutch element 198. The latter clutch element rotates continuously, so long as the motor 79 is in operation. As will now appear, the shaft and gear assembly when in initial position as shown by Fig. 6, is held against rotation through the pin connections between the gears and the pin connection of gear 215 to the stationary bracket 220. Actuation of the assembly to effect clutch-engagement at 198—199, and to release one or more of the gears 210, 213 and 215 for rotation thereof, is effected by mechanism operable in response to the passage of nickels, dimes and quarters through the machine, such mechanism including the heretofore described pivoted rods or levers 169, 172 and 173, as will presently appear.

As shown in Fig. 8, the rods 169, 172 and 173 each engages through a finger element, one end of a lever, the several such fingers, levers and related elements to be described, being numbered correspondingly to the associated rod, but bearing consecutive letter suffixes. Selecting one of the rods and its associated elements as an example, since the arrangement is substantially the same for the other rods, the pivoted end of rod 169 is downturned through a slot provided therefor in the bracket 160, to form a depending finger 169A, which engages the inner, notched or shouldered end of a lever 169B, the lever being pivoted intermediate its ends, as at 169C, upon one step of a stepped bracket 224. The opposite end of the lever 169B is formed to provide a furcated or saddle element 169D which engages and straddles the flange of a flanged-collar 169E secured to the shaft 200 (Fig. 6). In a similar manner and as appears in Fig. 6, the saddle element 172D engages an annular flange 172E formed on the sleeve shaft 212, while the saddle element 173D likewise engages an annular flange 173E formed on the sleeve shaft 214. From the relation of parts as appears in Figs. 7 and 8, it will be seen that a downward pivotal movement of the rod 169 will result through the finger element 169A thereof, in pivotal movement of the lever 169B, in a direction such that the lever in turn, and through the lever-collar connection 169D—169E to shaft 200, effects an axial shifting of the shaft 200 in the direction to engage the clutch element 199 with the driving clutch element 198 (Fig. 6). In like manner, pivotal depression of the rods 172 and 173 will result in axial displacement of the sleeve shafts 212 and 214 respectively, each in the same direction, as toward the clutch assembly 198—199. The rods 169, 172 and 173 are actuated from the coin singling device as herein described for the rods 168, 170 and 171, the rod 169 being actuated however, in response to the passage of dimes through the machine, while the rods 172 and 173 are actuated respectively, in response to the passage of nickels and quarters.

Operative connection of the several gears 210, 213 and 215 to the cash total counter 180 is effected through suitable ratchet means now to appear. A shaft 225 which provides the support for the counter mechanism 180, extends in parallel relation to the shaft 200 and is journalled at one end, in the left hand bracket 185 (Fig. 6), and at its opposite end, in the bracket 220, as at 226. Freely rotatable on the shaft 225 and located relatively adjacent the counter ratchet gear 170E, is an axially elongated pinion 227, with which the gear 210 enmeshes. As hereinbefore indicated the ratchet gear 170E is actuable through the rod 170 in response to the passage of a penny through the coin singling mechanism, to register the penny as cash, upon the counter 180. It will be understood, of course, that the gear 170E is actuated through only a tenth of a revolution to effect the registry of a penny upon the counter. This operation of the mechanism to register pennies on the cash counter, is independent of the mechanism now under discussion and which provides for the operation of the counter 180 to register and total nickels, dimes and quarters thereon. Pivotally carried on a lateral face of the pinion 227 is a ratchet element or dog 228, arranged to engage the ratchet gear 170E, while the pinion is formed to provide on its opposite lateral face, a ratchet gear 229. A second axially elongated pinion 230 freely journalled on shaft 225 and enmeshing with the gear wheel 213, is similarly provided on one face, with a pivoted ratchet element or dog 231 engaging the ratchet gear 229, and on its opposite face, a ratchet gear 232. Engaging the ratchet gear 232 is a dog 233 pivotally carried by a third axially elongated pinion 234 freely rotatable on shaft 225 and which enmeshes with the gear wheel 215. The ratchet connections of the ratchet gear 170E and pinions 227, 230 and 234 are such that the gear 170E may be actuated independently of the pinions, while rotation of pinion 227 will serve to drive the gear 170E and hence the counter assembly, but without effect upon the pinions 230 and 234. Similarly, rotation of pinion 230 will drive the pinion 227, gear 170E and counter mechanism, without disturbing the pinion 234, while rotation of the end pinion 234 actuates the counter 180 through pinions 230, 227 and ratchet gear 170E. The mechanism as now described and which may be hereinafter referred to generally, as a differential drive mechanism, thus operatively connects the several rods 169, 172 and 173 to the cash counter 180, for actuating the latter to register and total thereon, the passage of nickels, dimes and quarters through the machine. The provision for the registering of pennies on the counter has been described heretofore, so that the following operational description of the mechanism will relate only to that for registering the coins of higher denomination on the counter 180.

Referring first to the function of the registering mechanism as effected by operation of rod 169 in response to the singling of a dime in the machine, upon pivotal depression of rod 169 through the finger 149 of the singling apparatus, the shaft 200 through the connection from rod 169, will be axially displaced in a left-hand direction (Fig. 6), the extent of the displacement being such as to effect clutching engagement at 198—199 to effect rotation of the shaft. Immediately prior to or as the shaft clutch 199 engages the driving clutch element 198, the gear wheel 210 as pinned to the shaft 200 and hence moving therewith, will be released or unpinned from the gear wheel 213, so that the shaft and gear 210 are thereby free to rotate. It is to be noted here, that the cam 139 (Fig. 5) which is actuated in timed relation with the coin singling mechanism, is adapted through its camming nose 140 (the latter serving to pivot the arm 142 downwardly such that its finger 149 depresses the rod 169), to cause a depression of the rod 169 only momentarily, or for a predetermined short period of time such as will permit the rod thus depressed, to effect clutching engagement at the drive clutch and to release the gear 210 from its pinned connection to the gear 213. Thereafter and upon release of the rod 169, the spring 223 will tend to return the shaft 200 and gear 210 to initial position (Fig. 6), but at this time, the pins 216 on gear 210 are removed from registry with the apertures therefor, in the gear 213, as a result of shaft and gear rotation. The pins 216 then abut and ride over the face of gear 213, so that rotation of the shaft 200 and gear 210 may continue until the pins 216 again register with the apertures in gear 213, at such time and under the loading of spring 223, the pins will enter the apertures, as the shaft 200 and gear 210 are displaced to the right (Fig. 6), to thereby de-clutch the shaft element 199 from the driving element 198. It will be observed from Figs. 15 and 16 that by reason of the relative arrangement of the pins 216 on gear 210 and the pin-receiving apertures therefor, in gear 213, the gear 210 when released as above described, may rotate only through one-half a revolution before it again becomes pinned to gear 213. Accordingly, the gear ratio between the gear 210 and the counter actuating pinion 227 engaged thereby, is predetermined as will be explained more fully hereinafter, through the removal of gear teeth on the portions 211 of gear 210, such that the half-revolution of gear 210 will serve to rotate the pinion 227 through one revolution. The pinion 227 through its ratchet connection with the gear 170E, thereby actuates the counter 180 to register a dime thereon.

In the case of five-cent pieces or nickels, coins of this denomination are registered upon the counter 180 in a manner similar to that above described for dimes. Briefly describing the operation of the differential drive mechanism for this purpose, depression of the rod 172 in response to the passage of a nickel through the machine, effects an axial displacement of the sleeve shaft 212 toward the left as viewed in Fig. 6. The shouldered end of the shaft 212 upon which the gear 213 is mounted, thereby correspondingly displaces the gear 213, to release the same from its pinned connection with the gear 215. Coincidentally with the displacement of gear 213, the gear 210 is displaced thereby, through the pins 216, and such displacement of the gear 210 serves through its pinned connection with shaft 200, to actuate the latter so as to effect driving engagement of the clutch 198—199. Whereupon the gear 213 is rotated, as through shaft 200, gear 210 and pins 216, to rotate the pinion 230. Since there are five pins 218 on gear 213, arranged so as to be equally angularly spaced, the gear 213 may rotate only through one-fifth of a revolution before re-engagement of the pins in the apertures of gear 215. Therefore the gear ratio between the gear 213 and the counter actuating pinion 230 is selected such that a fifth-revolution of the former will produce a half-revolution of the latter, the pinion thereby driving the pinion 227 through the ratchet connection 229—231, and the pinion 227 in turn, actuating the gear 170E through its dog 228, each by one-half a revolution, to register a nickel upon the counter 180.

The counter 180 is operated to register quarters thereon, in substantially the same manner as that above described for nickels. In this case, however, depression of the rod 173 in response to the passage of a quarter through the machine, serves to displace the outer sleeve shaft 214, to release the pinned connection of the gear 215 from the bracket 220, and at the same time and through the gears 213 and 210, to displace the shaft 200 to effect clutch-engagement at 198—199. The drive to the gear 215 thus effected, occurs through the shaft 200, gear 210 in pinned connection to gear 213 and the gear 213 as pinned to gear 215. By reason of the relative arrangement of the pins 221—221A on gear 215 and apertures 222—222A in the bracket 220, as heretofore described, the gear 215 will rotate one complete revolution before the pins will be again in seating registry with the bracket apertures. Hence, the gear-ratio as selected for the gear 215 and counter actuating pinion 234 engaged thereby, is such that the single revolution of the former will produce two and one-half revolutions of the latter. Accordingly, the pinion 234 thus rotated, will drive the counter 180 through the ratchet connection 232—233 to pinion 230, the ratchet connection 229—231 to pinion 227 and dog 228 to gear 170E, to register a quarter thereon.

From the foregoing description of the differential drive assembly and its operation, it will be seen that the same gear ratio, i. e., two and one-half to one, obtains between gear 215 and pinion 234, and gear 213 and its pinion 230, while the effective gear ratio between gear 210 and its pinion 227 is two to one. According to the present exemplary embodiment of the device and as will be observed from inspection of Figs. 15, 16 and 17, each of the pinions 227, 230 and 234 is provided with twenty teeth. This, then, requires that each of the gears 213 and 215 be provided with fifty teeth, in order to effect the desired ratio for these gears. With respect to the gear 210, however, since its pinion 227 has twenty teeth and further, since the operative gear ratio of this gear-pinion set must be two to one, so that each half-revolution of the gear 210 will produce one complete revolution of the pinion 227 for the effective registration of a dime on the counter assembly, this gear must be of special construction, as illustrated in Fig. 15. Referring to the figure noted, the gear 210 may be defined, for simplicity of description, as being a fifty tooth gear mutilated to provide two diametrically opposite peripheral zones 211 each devoid of five teeth. The remaining forty teeth, therefore, are divided into two sectors of twenty teeth each, symmetrically disposed on opposite sides of a diameter through the mid-points of the zones 211. Thus with the gear 210 and pinion 227 initially related as shown in Fig. 15, a one-half revolution of the gear in the counterclockwise direction, as indicated by the arrow in the figure, will effect a complete revolution of the pinion, as driven by the left hand twenty tooth sector of the gear 210. The gear and pinion will then assume the same relative positions. However, it will be readily understood and fully appreciated that irrespective of the angular position of the gear 210 relative to the pinion 227, each and every one-half turn of the gear will produce a full turn of the pinion.

It will have appeared now, that say in the operation of the differential drive mechanism to effect registry of a quarter on the counter 180, the levers 172B and 173B will be pivotally displaced, but by reason of the arrangement wherein the inner notched ends of these levers are adapted for abutting engagement with the fingers 172A and 173A respectively, of the rods 172 and 173, they are thereby free to be pivoted away from and independently of the rods. Moreover, it is to be noted that the spring 223 in returning the drive assembly to initial position as shown in Fig. 6, serves also and through the connections between the shafts 200, 212 and 214 and the respective rods 169, 172 and 173, to return the latter to initial positions as such appear in Fig. 8.

As a means for audibly apprising a conductor or operator of the correct and effective registration of the individual coins passing through the machine, and for audibly distinguishing the denomination of each of the several coins, as pennies, nickels, dimes and quarters, there is employed an assembly of bells and bell-actuating mechanism best appearing in Figs. 8, 9 and 10. The series of bells of progressively greater size and hence progressively deeper in tone, are designated at 240, 241, 242 and 243. The elements are supported on an axial post or stud 244, carried by one of the walls of the case portion 35 and located above the bracket 160, the bells being kept in spaced relation from each other by washers or spacers 245. It is preferred that the series of bells progress in size as do the denomination of the coins handled by the machine, in the example shown, a one-cent piece or penny serving to sound the bell 240, and the twenty-five cent piece, the bell 243. Suitable and simple means may be employed for operatively associating each of the bells with say, the appropriate one of the rods 169, 170, 172 and 173 of the cash counter actuating mechanism. Selecting for exemplary description, the bell actuating means appearing in side elevation in Fig. 8, which serves to associate the rod 169 with the bell 243, the rod 169 which is actuated as heretofore described, in response to the passage of a ten-cent piece or dime through the machine, pivotally supports a detent 246 upstanding therefrom as shown. The detent 246 is spring urged into operative engagement with a ratchet wheel 247 rotatably journalled between the adjacent bracket wall elements 162 and 163 (Fig. 10) the detent serving, as the rod 169 is depressed, to rotate the wheel 247 a distance of say, one tooth. Extending horizontally and laterally through the wall elements 161—167 of bracket 160 (Fig. 9) is a plate 248, and supported by the portion of the plate located between the walls 162 and 163, is a finger element 249 which is adapted through a slot therein provided to receive plate 248, for longitudinal displacement thereon. One end or nose of the finger element 249 engages the ratchet wheel 247 and is urged against the teeth thereof, as by a suitable spring 250. The arrangement is such that for each actuation of the wheel through the distance of one tooth, the finger will be displaced to the left (Fig. 8) by one of the teeth, and as the particular tooth clears the finger nose, the finger will be returned, under the influence of the spring 250. As a result, the finger is reciprocated once for each actuation of the ratchet wheel by the rod 169, and this movement of the finger is utilized, through a pivotal, lost-motion connection 251 between the finger and one end of a bell striker lever 252, to actuate the striker against the bell 243. The striker arm or lever 252 may be pivotally supported as at 253, between the bracket walls 162—163.

Since the bell actuating means connecting each of the remaining bells 240, 241 and 242 with the respective rods 173, 172 and 170, are substantially identical with that described for the rod 169 and bell 243, the corresponding elements thereof may be designated by the same reference numerals but distinguished as by letter suffixes. Thus, the pivoted detent on rod 170 (Fig. 10) may be designated by 246A, that on rod 172 by 246C, etc. From the foregoing it will clearly appear that, with each actuating movement of any of the rods 169, 170, 172 and 173, a bell will be sounded indicating the rod actuated, and hence the denomination of the coin passing through the machine.

The correct and effective registration of small and large tokens passing through the machine and as registered respectively, upon the token counters 181 and 182, may be made audible in a manner similar to that above described for coins, as through bells of different tones. In the present example, however, it is preferred to actuate the token bells in a somewhat direct manner, from the token counter operating ratchets, as shown by Fig. 5. A bell 255 of a selected tone, is provided for small tokens and a bell 256 preferably of a deeper tone, serves the large tokens, these bells being supported upon an axial post 257, carried upon one frame element 184 of the token counter assembly. The bells are kept in spaced relation from each other by spacers 258. For actuation of the small token bell 255, there is pivoted to the same frame element 184, a striker lever 259 which is spring urged to engage the end thereof opposite its bell-striking end, with the toothed periphery of the ratchet wheel 168E of the small token counter 181. Thus as the ratchet wheel 168E is actuated to register a small token on the counter 181, one of the ratchet teeth will thereby actuate the lever to sound the bell 255. The same bell-actuating arrangement is provided for the large token bell 256, as through the spring loaded striker lever 260 in engagement with the ratchet wheel 171E of the large token counter 182.

The description has thus far related to the non-resettable, registering and totaling counters for small and large tokens, and for cash of the several denominations introduced to the fare box. These counters as actuated to register tokens and coins, serve to operate simultaneously therewith, corresponding but re-settable per-man counters now to be described. The per-man counters and the drive connections therefor, best appear in Figs. 6, 7 and 12, to which reference is now made.

Extending horizontally between the housing side walls 32 and 33, is a shaft 270 which is located inwardly adjacent the forward or front housing wall 31 and relatively closely beneath the sloping forward wall 271 of the housing portion 35. The ends of the shaft 270 are suitably journalled in bearing brackets 272 secured to the housing. Arranged on the shaft and in right to left order as appears in Fig. 12, are a cash registering and totaling counter assembly 273; a small token counter 274; a large token counter 275, and a pair of transfer registering counters 276 and 277, the several such counters being maintained in spaced relation, axially of the shaft, as by spacer elements 278, 278A, 278B and by spring elements 279 and 280 associated with the transfer counters 276 and 277. All of the counters are rendered visible for reading, through windows 281 in the housing wall 271 (Fig. 1), these windows being of sufficient dimension to enable ready observation of the total on each counter as viewed from outside of the box.

Referring in particular to Figs. 6 and 12, the cash counter 273 except for its re-settability as will hereinafter appear, may be substantially like the cash counter 180, and is actuated from and in parallel with the latter counter through a unilateral or one-way drive connection now to appear. The ratchet gear 170E of counter 180 has connected thereto or formed integrally therewith, a gear 282, with which enmeshes a gear 283 freely rotatable upon a shaft 284 having its ends journalled in the counter supporting brackets 185. Sleeved on shaft 284 is a ratchet type clutch device, one element 285 of which is operatively connected to the gear 283, while the other or mating element 286 is constrained through a pin and slot connection to the shaft, as at 287, for rotation with the shaft 284, and for axial displacement therealong. A spring 288 on the shaft, serves to bias the ratchet clutch element 286 toward and into engagement with the element 285. The directioning of the engaging ratchet teeth on the clutch elements is such that actuation of the counter 180 to register coins thereon, will serve through the connected clutch, to drive the shaft 284 in one direction of rotation, but any rotation of the shaft 284 in the same direction and as the driving element with respect to the clutch assembly, will result only in disengagement of the ratchet element 286 from the element 285, as will be readily understood.

The left end of shaft 284 (Fig. 6) projects outwardly beyond the bracket 185, and has secured thereto a bevelled pinion 290 which enmeshes with a like bevelled pinion 291 on the adjacent end of a shaft 292, the shaft 292 as will hereinafter fully appear, being utilized to transmit the coin registering operation of the cash counters to recording mechanism forming a part of the invention. Enmeshing with the pinion 291 is a third and like bevelled pinion 293 which is operatively carried on the lower end of a stub shaft 294. The shaft 294 is extended upwardly toward the per-man cash counter 273 and has secured to its upper end, a bevelled pinion 295 which enmeshes with a like bevelled pinion 296 on a short shaft element 297 rotatably journalled in a bracket 298 mounted on the forward wall structure 31 of the housing. The pinion 296 drives a gear 299 which enmeshes with the counteracting gear 300 of the per-man cash counter 273. The described drive connection between the cash counters 180 and 273, and including the several gears and pinions, is such as to effect a cash registering and totaling function of the per-man counter 273 in exact parallel with that of the counter 180. It will be understood in this connection, of course, that the totals appearing on the two counters normally, will not be the same, since the counter 273 as will later appear, is adapted for re-setting when desired and in accordance with its intended function as a per-man or per-day registering and totaling counter.

The paralleling drive connections between the small and large token counters 181 and 182, and the corresponding re-settable, per-man token counters 274 and 275, are substantially identical in function as to the elements thereof, to that above described for the cash counters. Accordingly, these drive connections may be here described briefly and in the following manner:

Considering first the drive for the small token counter 274 from the token counter 181 (Fig. 6), the drive connection is effected through a gear 310 driven from the counter actuating ratchet gear 168E of counter 181, to a gear 311 enmeshing therewith; from gear 311 to a shaft 312 through a unilateral drive clutch 313 (similar to clutch 285—286); from a bevelled pinion 314 on shaft 312, to a like bevelled pinion 315 on an adjacent end of a shaft 316 (the shaft 316 extending to recorder mechanism as will later appear); from a similar bevelled pinion 317 on shaft 316, to a like bevelled pinion 318 on the lower end of a vertically projecting shaft 319; from a similar bevelled pinion 320 on the upper end of shaft 319, to a like bevelled pinion 321 on a stub shaft 322 rotatably supported by a bracket 323, and from a gear 324 on shaft 322 to a like gear 325 operatively associated with and forming a part of the token counter assembly 274. Tracing the drive for the counter 275 registering large tokens, and as before, proceeding from the non-resettable counter 182, the drive connection comprises a gear 326 driven from the counter actuating ratchet gear 171E, gear 327, unilateral clutch 328, shaft 329, bevelled pinions 330 and 331, shaft 332 (extending to recorder mechanism later to be described) bevelled pinions 333 and 334, vertically projecting shaft 335, bevelled pinions 336 and 337, the latter on a stub shaft 338 rotatably supported by a bracket 339, and gears 340 and 341, the latter being the counter-actuating gear of the large token counter assembly 275. From the foregoing description of the per-man cash and token counters, it will readily appear now, that as the non-resettable cash and token counters 180, 181 and 182 are actuated, the related per-man counters 273, 274 and 275 will be actuated correspondingly.

In the operation of street railway and bus lines it is also frequently desired to record the number of transfers collected by the conductor in the course of a day or trip. For transfer registering, the independent transfer registering and totaling counters 276 and 277 hereinbefore briefly referred to, are provided on the shaft 270 (Fig. 12). These are manually operable from the exterior of the fare box, as by the respective actuating levers 276A and 277A projecting outwardly through suitable apertures therefor, in the front wall 31 of the housing. Referring in particular to Figs. 7 and 12, the inner end of the lever 276A is pivoted upon the shaft 270, and supports a pawl or finger element 276B which engages, under the influence of the spring 279 acting on the lever 276A, a ten tooth ratchet 276C in driving connection with the counter 276. The pivotal movement of the lever 276A is limited in a suitable manner, such that each depression of the lever serves to actuate the ratchet through a distance of one tooth, and thereby to register on the counter in decimal progression, the total of transfers collected. In like manner, the lever 277A is operatively connected to the counter 277, as by a finger element 277B on the inner pivoted end of the lever, engaging under the influence of the spring 280, a ratchet 277C of the counter mechanism. Each of the transfer counters is capable of being reset or restored to zero reading, by means later to be described. Also, the transfer totals on the counters 276 and 277 are transferred to recording mechanism, to provide for permanent records thereof, as will hereinafter appear.

As in the case of the cash and token counters, the conductor or operator may be advised, of transfer registration upon the counters 276 and 277, as by suitable bells. Accordingly, there is mounted upon a wall portion of the housing and adjacently above the counter 276, a bell 350 and its supporting stud 351. Also mounted on the housing wall portion is a pivoted, spring-loaded bell striker 352, which is operated from a projection 353 on the pivoted end of the counter actuating lever 276A (Figs. 11 and 12) through a suitable connection 354 of a type permitting bell-sounding actuation of the striker only upon depression of the lever 276A. Similarly, a bell 350A which may provide a sounding tone different from that of the bell 350, is associated through corresponding and like elements 352A, 353A and 354A, with the lever 277A of the counter 277, so as to audibly indicate registration of transfers on the latter counter.

Obviously a suitable provision must be made for resetting the counters 276 and 277 which register the number of transfers per man or trip, as well as the counter assemblies 273, 274 and 275, respectively indicating per-man cash, per-man small tokens and per-man large tokens. Each of the above counters is of a standard or well known construction, capable of being reset or returned to zero reading, and in the present example, each is so associated with the shaft 270 as a resetting agency common to all the counters, that say, a one-turn revolution of the shaft in the proper direction, will effect simultaneously, the desired resetting of the several counters. Necessarily, the resetting connection of the counters to shaft 270 is such as to prevent interference with the normal registering and totaling functions of the several counters. For the purpose of enabling a quick reset of the counters through shaft 270, by a single manual operation, there is provided a hand lever 360 (Figs. 1 and 7) secured to a shaft 361 extending inwardly of the housing side wall 32, and to which is also secured a plate-like member 362 (Fig. 25). The member 362 which provides an operating means for actuating certain elements of the recording mechanism, as will hereinafter appear, is formed to provide at one end thereof, a segmental gear 363 which enmeshes with a pinion 364. Rotative movement of the member 362, and hence of the lever 360, is limited by vertically spaced stops 365 on the housing wall, the member normally abutting the lower stop under the influence of a return spring 366 (Fig. 25), in which position of the member, the hand lever will be in raised position as shown. The pinion 364 engaged by the gear 363, is freely journalled upon a shaft 367 (Figs. 7 and 21), the shaft projecting inwardly of the housing and being journalled in the side housing wall 32 and in an inner frame wall 368. Connection of the pinion to the shaft is effected through a unilateral or one-way drive clutch 369 preferably of ratchet type, the operative arrangement of the clutch, which is suitably spring-loaded as by a spring 370, being such that upon depression of the hand lever 360, the gear 363 of member 362 will rotate the pinion 364 in the direction to force the clutch out of shaft-driving engagement. However, upon the return movement of the hand lever and the member 362, as effected by the return spring 366 after manual release of the hand lever, the gear 363 will rotate the pinion in the opposite rotational direction, which then serves to operate the clutch drive to the shaft 367 and thereby to rotate the latter.

The inner end of the shaft 367 has connected thereto, a bevelled pinion 371 which enmeshes with a similar bevelled pinion 372 secured upon a vertical shaft 373 (Fig. 11). The shaft 373 which is journalled at its lower end, in a bearing bracket 374, and at its upper end, in a bearing bracket 375, has secured to its upper end a bevelled pinion 376 which enmeshes with a similar bevelled pinion 377 secured to the adjacent end of a shaft 378, such end of the latter shaft also being journalled in the bracket 375. Shaft 378 is extended to the zone of the left hand end of the counter shaft 270, as viewed in Fig. 12, where a bevelled pinion 379 thereon, enmeshes with a like bevelled pinion 380 on the shaft 270. The gear-ratios between the gear-segment 363 and pinion 364 and the bevelled pinions 371—372, 376—377 and 379—380, are selected such that the counter shaft 270 will be rotated through one complete revolution upon each actuation of the described connection from the gear-segment 363, so that all of the counters 273—277 will be reset to zero readings simultaneously.

The operation of the several elements of the counter or register mechanism has been set forth in connection with the description of parts, and is thought to be fully apparent without a separate recital of operation. It will also have appeared from the preceding description, that the coin-counting device, and the registering mechanism are completely operative, each of itself, irrespective of utilization with the sorting mechanism heretofore described, and irrespective of utilization with the recording mechanism later to be described in detail.

Recording device

To the end of providing a permanent record, produced in a manner entirely free of the personal equation, of the per-man or trip totals, accumulated in the machine, it is preferred to utilize a form card punched or printed, say at the end of a run. The agencies employed for this purpose consist, preferably, of a plurality of groups of punch or printing elements so located in respect to a card holder in the casing, that when the card is punched or printed at the end of a run, the perforations produced by the punches will coact with definitely located legends on a record card to provide the desired readings. Although the individual recording elements are hereinafter referred to as plungers or punches, it will be understood that each thereof may be provided with a numeral or other character, and so serve as a stamping or printing die, as well as a perforating punch, the essential result being the production of a permanent record.

The card punching units employed correspond in actuation and reading, to the several per man counters, that is to say one plunger unit is provided to record the total visibly registered on the small token counter 274; another corresponding to the large token counter 275; still another providing a record of the reading of the per-man cash counter 273, and further, a pair thereof effecting a record of the readings of the transfer counters 276 and 277. Yet another plunger unit is employed to provide a record of certain facts incident to the use of a given fare box, as this will later appear. The six punch assemblies thus provided according to the present disclosure, are indicated generally (Figs. 5 and 11) at 400, for per-man cash; 401 for recording transfers, 402 for small tokens; 403 for transfers; 404 for large tokens, and 405 for recording data later to be indicated. Referring particularly to Fig. 12, the plunger units 400, 402 and 404 are actuated respectively, from the counter-driven shafts 292, 316 and 332 heretofore described, as by respective bevelled pinions 406, 406B and 406D secured to the shafts, and which enmesh respectively, with bevelled drive pinions 407, 407B and 407D for the units 400, 402 and 404. The transfer plunger unit 401 is driven from the transfer counter assembly 277, as by a drive connection which includes a counter gear 382 enmeshing with a gear 383 on a stub shaft 384 journalled in a bracket 385. Also connected to shaft 384 is a bevelled pinion 386 which enmeshes with a similar bevelled pinion 387 on the upper end of a vertical shaft 388. A bevelled pinion 389 carried by the lower end of shaft 388, enmeshes with a bevelled pinion 390 on a shaft element 391 journalled in a bracket 392. A bevelled pinion 406A which in the example shown, may be formed as a unit with the pinion 390, in turn enmeshes with a bevelled drive pinion 407A of the recorder unit 401. In a similar manner the transfer plunger unit 403 is driven from the transfer counter assembly 276, the elements of the drive corresponding to those of the drive from the counter 277 and being designated by the same reference numerals, but differentiated by letter suffixes.

As best appears in Figs. 12 and 25, actuation of the drive pinion 407E for the plunger unit 405, is effected from and in response to return movement of the recorder control and counter reset hand lever 360. For this purpose then, the lever operated member 362 is provided with a finger portion 408 projecting oppositely to the plate portion providing the gear-segment 363, the finger supporting a pin 409 adapted for camming-engagement with an angulate operating face 410 on the upper end of a vertically extending lever 411. The lever is pivotally mounted at its lower end, to the housing wall 32, as at 412, and is urged against a stop 413 by a spring 414. A pawl 415 pivotally carried by the lever 411, is spring-urged into engagement with a ratchet wheel 416 secured upon a horizontal stub shaft 417. The shaft 417 is journalled in the housing wall 32 and in the frame wall 368, and has secured to its inner end, a bevelled pinion 406E which enmeshes with the bevelled drive pinion 407E of the recorder unit 405. Thus, upon depression of the hand lever 360, the finger-carried pin 409 will engage the face 410 of lever 411, and therethrough, to pivot the lever away from its stop 413, as to the left in Fig. 25. As a result thereof, the pawl 415 will be re-engaged with one of the ratchet teeth on wheel 416, so that upon a release of the hand lever 360, the finger-pin 409 will be released from the lever 411, to permit the spring 414 to return the lever against its stop 413. The return movement of lever 411 results in rotation of the ratchet wheel 416, as effected through the pawl 415, the arrangement being such that the wheel is thereby rotated a distance of one tooth, or as in the present example, through one-tenth of a revolution since there are ten teeth on the ratchet. Thus the shaft 417 as driven by the wheel 416, will be rotated through one-tenth of a revolution, and through the shaft pinion 406E enmeshing with the drive pinion 407E of the recorder unit 405, will serve thereby, to cause a one-tenth revolution of the latter pinion.

Referring now to a description of the individual recording assemblies, since the construction of each thereof is, or may be, identical except for the number of rotatable and plunger elements employed, the largest such unit, viz., 400 will be described by reference to its several parts, and the corresponding parts of each of the units 401, 402, 403, 404 and 405 will be similarly designated by numerals, but distinguished by different letter suffixes, the parts of unit 401 being differentiated by suffix A, the unit 402 by suffix B, unit 403 by suffix C, unit 404 by suffix D, and unit 405 by suffix E. All of the punching units are assembled in and may be partly or substantially enclosed by a frame structure 418 (Figs. 5, 11 and 21).

Proceeding now with the description of the unit 400, arranged between and journalled in the lateral walls of the frame 418, is an echelon arrangement of shafts 420, 421, 422, 423 and 424. The shaft 420 is rotated in step-by-step manner by the gear 407 secured thereto outside of the case wall, the gear 407 being driven, as described, by gear 406 and the associated counter-driven shaft 292. Each of the shafts except the last shaft of the series, carries a pinion 425 engaging in appropriate ratio a gear 426, enmeshing in turn with a gear 427 secured to the next parallel shaft in the order of the series, as clearly appears in Fig. 26. The shafts of the series are thus related decimally after the manner of the counter elements heretofore described. It has been found expedient to employ pinion elements 425 which may comprise only one or two teeth, so that, as the shaft 420 rotates one revolution, the adjacent shaft 421 will be rotated one-tenth of a revolution, and so through the series of shafts of each unit.

Each of the horizontal shafts 420, 421, etc. carries a drum 428, the drums being uniform throughout the unit in the example disclosed (Figs. 5, 11 and 21). Axially and angularly spaced at even intervals about each drum 428, are a plurality of projections 429, and arranged in spaced planes transversely of the axis of each drum is a series of plungers or punches 430, the plungers being laterally spaced from each other and each located so as to be engaged by only one of the projections 429. The punches, one of which is shown in perspective elevation by Fig. 20, are supported by and between spaced plate elements 431, the plates being held in spaced relation by and between the opposite, inner frame walls 432 of the frame 418 of the unit. Each plunger is characterized by a down turned nose portion 433 which normally overlies the face of the drum in a position for engagement by the projection 429. Each plunger may be urged to such initial position by a suitable return spring (not shown in the embodiment presently under description), or as preferred in the instant example, each is free to be returned to its initial position, when not held outwardly by its actuating projection 429, during and as a result of, the card punching or printing actuation of the recorder, as this will appear hereinafter. A plurality of guide pins 434 struck from the plates underlying the several horizontal series of plungers (Fig. 5), serve to confine the plungers to longitudinal reciprocable movement, as well as to laterally space the plungers. Further, the reciprocable movement of each plunger may be limited to the extent required for recording operation thereof, as by an upstanding pin 435 on the adjacent plate, projecting through a longitudinal slot 436 in the plunger (Fig. 21). As will appear from Fig. 11, each of the drums 428 is shown as provided with ten of the cams or projections 429, each adapted to register with and engage one of a row or group of ten plungers 430. Thus the unit 400, provided with five drums, contains fifty of the plungers, and each of the other units shown as embodying three of the drums, contains thirty of the punches.

As shown in Figs. 19, 21 and 23, each of the drum shafts 420, 421, etc. at the drive end, is provided with a ratchet wheel 437 which is engaged by a spring-loaded, pivoted pawl 438. The pawl and ratchet means thus associated with the drum shafts, serve to prevent backward or return movement of the drums in the step-by-step actuation thereof, as will be now appreciated.

The housing frame wall 368 which serves to support the frame 418 of the recorder mechanism, is provided with apertures grouped to receive and pass the ends of the several plungers 430, and to act as guides therefor. These openings are indicated at 439. Spaced slightly outwardly of and parallel to the wall 368, are two plate or wall members 440 and 441 normally relatively spaced and containing plunger apertures 442, corresponding in size and location to those designated at 439, the arrangement being such that the plungers may each bridge a given pair of openings 442 in the plates. The walls 440 and 441 provide a card pocket or well 443 therebetween, for the reception of a record card as the card 444 of Fig. 24, the card well being of such a size as to position the card with its rows of numerals 445 appropriately disposed with respect to the plunger apertures. The plates 440 and 441 are shiftably positioned within the case, as guided by plate-supporting pins 446 secured to frame wall 368, and are spring-retracted to the positions shown in Fig. 19, by coil springs 447 engaging plate 440 and similar springs 448 engaging plate 441 (Figs. 12 and 21).

Actuation of the plates 440 and 441 with a record card 444 placed in the receiving well 443 formed thereby, toward the punch assembly to effect record-punching of the card according to the totals accumulated by the machine, is effected from the hand lever 360 and in response to the depression of the lever, as will presently appear. Secured to or formed as a part of the plate 440, and located on the portion of the plate which is centrally opposite the punch assembly, is a circular flanged member or boss 450 which is centrally apertured, as at 451, to receive and journal therein, the inner end of a shaft 452 (Fig. 27). The opposite end of shaft 452 is journalled in the housing side wall 32, and has operatively secured thereon, a pinion 453 which enmeshes with a segmental gear 454 provided on the lower end portion 455 of the hand lever actuated plate 362 (Fig. 25), so as to be actuated thereby. Also secured to the shaft 452 is a disc element 456, which has formed near the periphery thereof, a laterally projecting camming element 457. Similarly disposed on the opposing face of the member 450, is a like camming element 458, and as appears in Fig. 27, the mating faces of the cams 457 and 458 bear a diagonal relation to the axis of the shaft 452. The operative arrangement of the mechanism above described, for connecting the hand lever 360 to the plate 440, is such that as the hand lever is depressed the gear 454 on the plate 362, will rotate the shaft 452 through the pinion 453, and thus effect a coaction of the camming surfaces on the elements 457 and 458, to displace the latter and its plate 440 inwardly toward the punch device. As a result, there is effected in sequence, displacement of plate 440 toward plate 441, to position and somewhat compress the record card 444 therebetween, and then displacement of both plates 440 and 441 with the card 444 therebetween, toward the frame wall 368. In the latter step, the displacement of the card as held between the plates 440 and 441, toward the punch assembly, will force the card against the ends of such of the plungers 430 as have been actuated to card-punching positions, and so indicating by punch marks in the imprinted legends 445 of the card 444, the desired per-man totals.

There have heretofore been described the agencies by which the rotation of shaft 361 through the return actuation of lever 360, following depression of the latter, serves to reset the several per-man counters of the registering device heretofore described. Hence it will now appear that, by the initial actuation or depression of lever 360 following the insertion of a card 444 in the card pocket, a permanent record of per-man totals is thereby effected. It is to be noted here that where the plungers 430 of unit 400, plungers 430A of unit 401, etc. are not retracted or biased to initial positions by springs or other positive means, as is the case in the present example under description, such thereof which are found in punch-projected positions but not held therein by the drum actuating elements 429, 429A, etc., will be returned as a result of the punching displacement of the card, and without affecting the card. This result is thought to be obvious now, and to require no further explanation.

The arrangement of the drums 428 and projections 429 thereon, is by preference such that one of the projections and an associated plunger, corresponds to a zero reading in a given column. The arrangement is further such that, due to the angular spacing of the projections 429 on each drum, no more than one plunger of a given row in a given unit or group, is extruded at a given time. This is due to the fact that, as a succeeding plunger is actuated, the preceding projection 429 will clear its plunger so that at a given time only one plunger can be held in an extended or extruded position, by any given drum 428. The same arrangement obtains, of course, in each of the units 401–405.

My preference is to provide one plunger in each row corresponding to a zero reading so that, in the event no coins have passed through the machine since the last reset, and a card is punched, a zero reading will be obtained as indicated by punch marks in the zero positions of the several columns of the indicia 445 on the card 444.

In order to insure that the drums 428, 428A, 428B, etc. are each rotated to a definite position so as to cause maximum extension of the punch or plunger, and is definitely retained in such position until moved to the next one, there are provided for each drum in connection with the drum shafts, a notching device (Fig. 25), consisting of a spring-loaded pawl 438 engaging a ratchet wheel 437 on the drum shaft, as heretofore described. Thus each drum is releasably retained in each of, say, ten selected positions wherein one of the plungers associated therewith, is moved and held outwardly to maximum extent.

It may here be noted that, in the unit 400, the left hand drum (Fig. 5) constitutes a cents counter, the next to the right being readable in ten cent units, thence in order, dollars, ten dollars and one hundred dollar units. In each of the recording punch units 401, 402, 403 and 404, the three drums in order from left to right, are utilized to indicate units, tens and hundreds. With respect to the last or lowermost unit 405 of the recorder mechanism, this unit is actuated in response to the return movement of the hand lever 360, as hereinbefore described, so that its punch elements or certain of them, will be extruded for card-punching, upon the next or succeeding depression of the hand lever to effect punching of the record card 444. This last punch unit then serves to mark or punch the card 444 in respect to certain data provided on the face of the card, apart from cash and token totals. As indicated on the card 444 (Fig. 24), the "Card No." column thereof will be aligned with the punches of the unit 405, when the card is placed in position, in the recorder well 443. Thus, the arrangement of the unit 405 may be such as to punch a card, as card number "1" in the record-card punching operation, the return movement of the lever 360 then re-setting the unit for the number of the next succeeding card so punched, as card number "2," etc. Moreover, as shown in the present example and as best appears in Fig. 5, the recorder or card-punching mechanism may include additional, adjustably fixed punch elements, as the punch elements 460 arranged in four vertically spaced, horizontal series of ten punches each. These punches align with the last column of indicia on the card 444, as the numbers for indicating the "Box No." of a given fare box. Thus, certain of the punches 460 according to the box number desired to be recorded on the card 444, will be pre-set in extruded positions, so that in the card punching process, the desired box number will be punched or recorded in the appropriate column of the card.

While the operator's run card 444 as illustrated by Fig. 24, discloses a total of fourteen distinct columns of record indicia or numerals, only those headed by "Cash"; "Spec. A" (transfers, from recorder unit 401); "Small Tokens"; "Spec. B" (transfers, from recorder unit 403); "Large Tokens"; "Card No.," and "Box No.," are acted upon in the punch device of the fare box embodiment hereindescribed. However, the columns not punched by the presently described recorder device, may be pre-punched or otherwise suitably marked, either by hand, or by a separate punching machine adapted for the purpose. It may be noted in this connection that certain of the latter columns, as those headed by "Car No.," "Line No.," and "Run No.," may be punched in the present recorder mechanism, as by including therein, appropriate adjustably fixed punch elements therefor. Although such are not shown by the present disclosure, the additional punch assemblies may correspond to the assembly of punch elements 460 located at the bottom of the recorder mechanism (Fig. 5).

Turning now to the provision herein, for resetting the several plunger assemblies, with the exception of the plunger unit 405 which is controlled, as described, from the hand lever 360, it will have appeared that, since each recording unit is actuated by connections operating through unit ratio, as driven from its associated per-man or trip counter, a suitable independent drive may be provided for each unit, to effect resetting thereof to zero recording position. Accordingly, it is proposed to employ the single manual operation of resetting the per-man counters by actuation of the hand lever 360, to also reset and clear the recording units 400–404.

The recorder resetting mechanism which best appears in Figs. 11, 21 and 22, will be described in detail, in connection with the larger or cash recorder unit 400 only, since the resetting mechanisms for the other units 401–404, are but duplicates thereof. However, the corresponding reset elements of the latter devices will bear similar numerals but distinguished by different letter suffixes, after the manner of the descriptive designations of the principal parts of the several punch units hereinbefore described. Referring to the punch unit 400, each of the drum shafts 420–424 supports on the end thereof opposite its counter drive end, a unidirectional or ratchet type clutch device 470, one element of which is secured to the shaft end, while the mating element is free on the shaft, and is urged into engagement with the first by a coiled spring 471. Each of the clutch elements which are free on the drum shafts, carries or has formed as a part thereof, a pinion 472. All of the pinions are rotatable in unison and in the same direction, through interconnecting gears 473, the arrangement being such that the pinion 472 on drum shaft 420 enmeshes with one of the gears 473, the latter in turn, enmeshing with the next adjacent pinion 472 on drum shaft 421; the latter pinion enmeshes with another of the gears 473 which in turn, enmeshes the next pinion on drum shaft 422, and so on to the last pinion 472 on drum shaft 424. The arrangement and operation of the several unidirectional clutches are such that during rotation of the drum shafts in the recording cycle of the recorder mechanism, the clutch pinions will not be rotated, but will be axially displaced against the loading of the clutch springs 471, to release the clutch. When, however, the several clutch pinions are driven from the counter resetting drive as will presently appear, and are thereby rotated in the same direction of rotation to which the drum shafts are subject, as driven from the trip counters, the clutches will become engaged to drive the drum shafts, to the end of resetting and clearing the punch actuating drum assemblies.

The recorder resetting drive to the clutch pinions 472 and gears 473, is effected in the present example, from the operating shaft 373 of the counter resetting drive heretofore described. For this purpose, the resetting drive may be effected from shaft 373 to one of the gears 473, or as presently preferred, to one of the clutch pinions 472, as the pinion 472 associated with the recorder drum shaft 421 (Figs. 11 and 21). As appears in the figures referred to, the end 474 of shaft 421, operatively supporting one element of the clutch 471 associated therewith, terminates inwardly of the adjacent end wall 475 of frame 418. Axially aligned with such shaft end and normally abutting the same, is a stub shaft 476 which is rotatively and axially slidably journalled in the wall 475. Secured to the inner end of the stub shaft, are the pinion 472 and mating element of clutch 471, the pinion and clutch element projecting forwardly of the stub shaft and freely journalling on the drum shaft end 474. The opposite end of the stub shaft is projected outwardly beyond the frame wall 475, to receive an elongated hub 477 of a bevelled gear 478, the latter as shown (Fig. 11), enmeshing with a similar bevelled gear 479 secured to shaft 373. The gear hub 477 is slotted in the axial direction, as at 480, and receives therein a pin 481 secured to and projecting transversely of the stub shaft; the pin and slot connection thus serving to operatively connect the stub shaft and gear 478 for conjoint rotation, and to permit axial displacement of the stub shaft relative to the gear 478. The latter provision enables resetting drive disconnection at the clutch 471, during counter actuation of the recorder, as will now readily appear. Accordingly, it will be now appreciated that the recorder reset connections are such that, as the per-man counters are restored to zero reading, the corresponding plunger units will be restored to a position wherein the zero plungers are held extended. Thus a card may be punched at the beginning of a trip or run to indicate a cleared machine.

The operation of the punching units has been described in connection with the description of elements thereof, and is accordingly thought to be fully apparent. Essentially these units will follow the corresponding counters in operation so as to provide by inserting and punching a card, a permanent record of the data visibly ascertainable at any time from the per-man cash and token counters 273, 274 and 275, and from the transfer counters 276 and 277. It will further appear that the counters proper may be omitted in case their use is not necessary, and that the recording mechanism, including the punching units and the drive elements thereof may be utilized entirely independently of the counters, as a complete and operative agency; also that the recording mechanism as embodied in the punching units, is functionally independent of the specific coin singling and sorting mechanism first above described.

It will appear from the foregoing that the now described embodiment of the present invention results in a fully automatic, entirely fool-proof, and preferably power-operated mechanism which serves to eliminate the hazards and losses heretofore existing, due to the personal equation. The devices constructed in accordance with the invention serve to sort and receive in separate magazines the coins of different denominations, at the same time, affording a visual indication of totals accumulated by the machine and, as desired, a permanent record of such totals.

The recorder mechanism as described hereinabove, is adapted for producing a record of the totals accumulated by the machine, by a card punching process, employing for this purpose punch or plunger elements 430 of the form best appearing in Figs. 5, 20 and 27. As before indicated and as will now appear, the recorder may be adapted readily and easily, for the production of a printed record of the totals upon a suitable record card provided therefor. The only changes necessary in the recorder mechanism as described for card-punching operation, reside in the adaptation of the several plunger elements 430, 430A, etc. for card-printing, and in the provision of an inked printing ribbon or tape and actuating mechanism therefor. In all other respects, the recorder mechanism and the apparatus for presenting a record card to the record producing plungers thereof, may be substantially the same in each case. Accordingly, the corresponding but unchanged elements of the recorder as adapted for a card-printing function, will bear the same reference numerals applied to the card-punching recorder.

The recorder as modified in the above respects, is illustrated by Fig. 28, wherein all of the card-punching plungers 430, 430A, etc. of the several units 400, 400A, etc. are now replaced by similar plungers 500, 500A, etc., each of which has formed on its card-engaging end a suitable, raised printing indicia or numeral. One of these plungers is illustrated in perspective, by Fig. 29, and bears the numeral "2" on the printing end face thereof. The card-well forming plates 501 and 502 corresponding to the plates 440 and 441 as described for the punching recorder, differ therefrom only in that the plate 501 is imperforate, to provide an unbroken back or printing platen for a record card, while the plate 502 is changed in respect to the corresponding plate 441 only as to the provision of a ribbon or tape receiving slot 502A in its upper end.

Secured to and projecting inwardly from the upper end of the frame wall 368, is a bracket 503, upon which is rotatively mounted in a readily removable manner, a spool 504 supporting a roll of printing ribbon or tape 505. The spool is retarded or "braked" in its rotation, by a suitable leaf-spring element 506 in engagement with a peripheral portion of the latter. The printing tape is extended upwardly from the spool-roll, through a slot 507 provided therefor in frame wall 368, through the slot 502A in card-plate 501, and thence downwardly between the plates 501—502 and over the inner face of the latter. The lower end of the tape is then carried over a suitable guide roller 508 and through a slot 509 in wall 368, to a tape-receiving or wind-up spool 510 rotatably supported by a bracket 511. In order to present a clean section of the tape for each card-printing operation of the recorder, the wind-up spool 510 may be driven from the recorder mechanism in a manner such that the tape will be displaced upon the actuation of the recorder to set-up the printing plungers thereof. For this purpose, there is operatively secured to the lower spool 510, a gear element 512 which enmeshes with an intermediate or idler gear 513, the latter in turn enmeshing with a drive gear 514 on say, the drum drive shaft 420E of the lower plunger unit 405. Thus the wind-up spool is driven from the recorder unit 405, to effect the desired displacement of the printing tape 505 for the purpose indicated.

The card-printing operation of the printing recorder is believed to be now fully apparent, so that no detailed description thereof is needed, except to point out that the record-card when inserted in the recorder well, will be behind the tape, such that when the card is urged against the extruded printing plungers, the latter will bear against the tape to imprint the legends or numerals of the plungers upon the card.

A further modification may be made in the card-punching recorder mechanism hereinbefore described, in respect to additional printing mechanism for collecting and printing the totals accumulated on the recorder, say at the top of the respective card-columns punched by the recorder plungers. The modified structure to accomplish the above purpose, is shown by Figs. 30 through 33, and as before, the elements of the recorder disclosed therein, which remain unaltered over the corresponding elements of the recorder as heretofore described, are designated by the same reference characters applied to the latter. Moreover, the present description will be confined to the large unit 400, since the printing arrangements for the other units 401–404 are similar.

Each of the drum shafts 420, 421, 422 and 423 (the shaft 424, its drum and coacting plunger assembly being omitted in the present example) is provided on the end thereof to which the recorder resetting drive is connected, with a bevelled pinion 520. A similar bevelled pinion 521 enmeshes with the pinion 520, and associated in driven relation with pinion 521, as through intermediate or idler gears 523, is a gear 524 connected to a numeral-bearing disc or drum 525. The drum 525 which bears raised numerals from 0 to 9 equally spaced about its periphery, is located at the card-punching end of the recorder and projects forwardly therein, through an aperture provided therefor in the frame wall 368. As appears in Fig. 30, there are four such numeral discs, arranged in vertically spaced, horizontal superposed relation, one thereof for each of the drum shafts 420–424. Card locating plates 526 and 527 supported and actuated in the same manner as the corresponding plates 440–441 heretofore described, are modified over the latter, in that the inner plate 527 along one vertical end thereof, is apertured, as at 528, to receive therethrough, the numeral discs above described. The outer plate 526 is provided with blocks or pads 529 of rubber or other resilient material, in register with the plate apertures 528. These elements 529 serve as a soft backing for the portions of the record card to be printed by the numeral discs, as will readily appear. A printing ribbon or tape 530 is included in the printing assembly, arranged so as to lie between the numeral discs and the card to be printed thereby, in the printing process. The printing ribbon here employed, may be mounted and actuated substantially as described for the printing ribbon 505 of the printing-recorder illustrated by Fig. 28.

The arrangement of the totals printing mechanism as now described, is such that the totals accumulated by the recorder, will be set up on the numeral discs in a manner readily apparent. Thus in the card-punching and printing process, the totals will be printed on the card in spaces provided therefor, at the head of the several columns, as appears at 531 on the record-face of the card shown by Fig. 34.

A further modification appears in the recorder embodiment under present discussion, in respect to the card-punching plungers 430, 430A, etc. of the several recorder units 400–405. These elements as here shown, are modified to provide round card-punching ends 532, which in the card-punching operation, are received in correspondingly round apertures 533 in the card-locating plates 526 and 527. Also, the several plungers are biased or urged to retracted or initial positions, by return springs 534, a provision which may be included, if desired, in the punch assemblies 430, 430A, etc. of the principal embodiment of the recorder heretofore described.

It is to be noted here in connection with the printing discs 525, 525A, etc., as driven from the drum shafts of the recorder units 400, 401, etc., that the operation of resetting and clearing the recorder mechanism, will serve at the same time, to reset the printing discs to zero reading, as will now be obvious.

*Modified coin singling and sorting device*

There may be employed in the fare box assembly of the present invention, a somewhat modified coin singling and sorting mechanism, which accomplishes the same result attained by the singling and sorting device hereinbefore described, but in a different and yet improved manner. The modified device for example, enables the car-operator to follow and check or remove spurious coins during the sorting process of the machine. Additionally, provision is made therein for initiating operation of the motor 79 from which all of the operating parts of the machine are driven, solely in response to the reception of a coin in the coin-singling zone of the singling device. These and further improvements will become apparent as the description proceeds.

Referring now in particular to Figs. 35 and 36, and to Fig. 2 for reference to the coin-receiving and directing plate 52 as appears therein, the coin plate 52 in the present modification is by preference, arranged somewhat lower in the box housing, such that its coin-discharge end 54 is disposed within the frusto-pyramidal housing 35 (Fig. 1), and adjacent one wall thereof. In register with the circular discharge aperture provided by the plate end 54 and depending therefrom, is a tubular member or coin-receiving conduit 550, the lower end 551 of which engages and rests upon a surface portion of a plate-like member 552 seated in an aperture 553 provided therefor, in a horizontal bed plate 554, the location of the member being inwardly adjacent the housing side wall 33, as appears in Fig. 35. The member 552 is formed to present opposite laterally projecting flanges 555 which seat upon the adjacent margins of the bed plate and through which the member is secured to the plate, as by screws 556 (Figs. 35, 38 and 39). Extending centrally and longitudinally inwardly from one end 557 of the member 552, is a channel 558, adapted for the reception of a coin-singling plunger or slide 559 which is retained for reciprocable movement therein, by guide flanges 560 formed on the member and closely overlying the plunger when engaged in the channel. The forward or coin-engaging end 561 of the plunger is bevelled as shown in Fig. 36, to present a coin-contacting edge 562 of a thickness corresponding to the gauge of say, a worn ten-cent piece which may be introduced to the machine. Thus the plunger is adapted for contact with but one coin at a time. The lower end portion of the tubular member 550 adjacent the plunger channel, is undercut as at 563, so that the slide may pass thereunder and over the surface portion 564 of the member 552, which underlies the tubular coin conduit 550. In order to assure the singling and discharge of but one coin at a time, from the coins collecting in the conduit 550 and resting upon the surface 564 therebelow, the lower conduit end portion which overlies the coin discharge surface 565 of member 552, is undercut as shown in Fig. 36. Releasably closing the opening resulting from undercutting the tubular member in the zone indicated, are adjoining arcuate singling fingers 566 which are movable vertically, upon finger mounting pins or studs 567. Coiled springs 568 encircling the several pins 567, serve to urge the fingers downwardly against the surface 565 of member 552. The lower ends of the fingers are bevelled as shown, to provide camming surfaces for coaction with the bevelled forward edge of the coin plunger 559, the plunger as it passes beneath the fingers in its movement to displace a coin toward sorting mechanism later to appear, thereby camming the fingers upwardly. Although cammed upwardly by the plunger, the fingers nevertheless, remain in spring-urged contact with the latter, which serves effectively, to prevent plunger-ejectment of more than one coin from the coins received in the conduit 550.

Actuation of the plunger 559 for reciprocating movement thereof, is effected from the motor 79 (Fig. 6), through a vertical drive shaft 569 journalled in bearing brackets 570. The shaft 569 corresponds in purpose, to the shaft 73 of the singling mechanism shown by Fig. 5, and hence, it may be driven from the motor 79 through a connection (not here shown) which may be similar to that provided for shaft 73. To the upper end of shaft 569 is operatively secured a wheel 571, the wheel having pivotally secured upon its upper surface and adjacent the periphery thereof, one end of a plunger operating link 572, the pivotal connection being effected in the present example, by a pin 573. The opposite end of link 572 is similarly pivotally connected to the rear or trailing end of the plunger, as by a pin 574. The arrangement is such that for each full revolution of the shaft and wheel 569—571, the plunger 559 will be reciprocated once, between the limits of its travel. The normal or initial position of the plunger is that shown by Fig. 35, wherein it is retracted from beneath the coin conduit 550.

Energization of the motor 79, for operation of the coin-singling and sorting mechanism, as well as the registering and recording mechanism, is controlled from the coin-receiving surface portion 564 of member 552, by motor-circuit controlling contacts now to be described. Embedded in the member 552 so as to be exposed centrally of the surface 564 thereof, are contact elements 575, each projecting beneath the member 552 to provide terminals 576 for connection in controlling relation to the motor power circuit (not shown). The arrangement of these contacts in the motor circuit is such that upon a coin being received in the fare box and coming to rest flat upon the surface 564 of the singling device, the coin being metallic and further, in nearly all cases, characterized by metal of good electrical conductivity, will serve thereby to bridge the contacts and hence to complete the motor circuit therethrough. Thus, motor operation being initiated in this manner, the plunger 559 will be then displaced forwardly over the surface 564, to single and displace the lowermost coin toward and into a coin sorting device presently to appear. In order to continue the operation of the motor 79, so that it may drive the mechanism of the fare box, as the singling and sorting, registering and recording mechanisms, to the end of the cycle for each coin and until the plunger is again retracted to its initial position, ready for the singling of the next coin coming into contact-bridging relation to the contacts 575, there is embedded in the under surface of the plunger 559, a contact-bridging plate 577 which is adapted and so located as to bridge the contacts before the coin providing the initial contact-bridge, is displaced therefrom. The plate 577 then serves to maintain the motor circuit closed during the singling and coin ejecting function of the plunger, and until the plunger is substantially returned to initial position. It will be observed that the circuit is opened at contacts 575, just prior to the full-return of the plunger, but the drive momentum then existing, will complete the plunger return, as will be appreciated. Also, and for reasons now readily apparent, the coin conduit 550, plunger 559, base member 552 and optionally, the singling fingers 566, are formed from suitable insulating material, as hard rubber, Bakelite, or the like.

As a coin is singled and ejected from the singling zone, by the plunger 559, it is thereby displaced over the surface 565 of member 552 and beneath a guide plate 578 overlying the surface 565 (Figs. 35 and 39), toward and into a tapered, coin-receiving mouth or chute 579 of the coin sorting mechanism denoted generally, by the numeral 580 (Fig. 36). However, before the coin is discharged into the chute 579, a marginal portion of the coin contacts a roller 581 journalled on a fixed pin 582, the roller providing one element of coin-gauge mechanism now to appear. Immediately prior to or as the coin contacts the roller 581, it engages on another peripheral portion thereof, a roller 583 carried on one end of a pivoted lever 584, and located to one side of the line of coin-travel from the singling zone. The lever 584 pivoted intermediate its ends, as at 585, will be pivoted in a clockwise direction as viewed in Fig. 35, as the coin abuts the roller 583 thereon, the pivotal movement of the lever continuing until the coin attains a position diametrally between the rollers 581 and 583. The extent to which the lever is thus pivoted, to the point where the coin is located diametrally between the rollers, thus provides an index as to the diameter of the coin, and hence of its denomination. Thus the lever 584 and its roller 583 constitute a coin gauge which corresponds in purpose, to the coin gauge 103 hereinbefore described and as shown by Figs. 5 and 14. Accordingly, the lever 584 is utilized for operating elements of the coin sorting mechanism 580, and also, for operating the control arm 142 (Fig. 5) of the coin-counter drive mechanism, as will presently appear. It is to be noted as a preference in the present example of the modified coin singling structure, that the coin gauge arm 584 and its roller 583, the roller 581 and the guide plate 578, all are formed from suitable insulating material, as hard rubber, Bakelite, or the like. Also, as shown by Fig. 39 in particular, a portion of the plate member 552 is cut-away, as at 586, to accommodate the gauge roller 583 and thereby, to facilitate presentation of the roller surface for contact by each coin ejected from the singling zone of the device.

Pivotally connected to the opposite end 587 of the gauge lever 584, is one end of a bar or lever 588, the opposite end of the latter in turn, being pivotally connected to the outer or free end 589 of a crank arm 590 (Fig. 35). The hub 591 of crank 590 is operatively secured to a vertically arranged stub shaft 592, which is journalled in and extends downwardly through the bed plate 554. Similarly connected to the shaft 592 but below the plate 554 is another crank arm 593 appearing in broken lines in Fig. 35, the outer end of which is suitably connected to the arm 142 (Fig. 5), as by the lost-motion connection shown in broken lines at 594. The operation of the arm 142 from the coin gauge lever 584 corresponds to the same as described for the arm 142 and coin gauge 103, and hence such will not be here repeated.

Turning now to the coin sorting mechanism 580, for the purpose of the present example, it is adapted for sorting and delivery of coins of but five different sizes, to a detachable money changer 595 having a corresponding number of coin chambers, as the chambers 595A for quarters, 595B for nickels, 595C for pennies, 595D for dimes and 595E for tokens of one given size (Fig. 37). The changer 595 here employed, may correspond in type and structure to the changer shown by Fig. 1, differentiating therefrom only in that it provides but a single token chamber instead of the two for different size tokens, in the latter changer. However, it is to be understood that the presently modified sorting mechanism may be readily adapted to the six-chambered changer 122, or to any other changer providing a desired number of coin receiving chambers.

The device 580 includes a coin-chute structure 596 of plate-like form, which is arranged in a vertical plane and located above and in vertical registry with the coin-receiving openings of the changer 595, the plate structure further extending between the opposite side walls 32 and 33 of fare box housing (Fig. 37). The structure 596 is formed to provide in an upper corner thereof, a coin-receiving throat 597 with which is registered the coin passage 598 in a member 599 providing the coin-receiving mouth 579, the latter being in line with the discharge zone of the singling mechanism, as before described. As appears in Figs. 35 and 36, the tapered mouth 579 is so adapted as to turn a coin received therein, for vertical edgewise delivery thereof downwardly in the passage 598, in which relative position the coin thence proceeds through the sorting device. The structure 596 is formed further, to provide in communication with the throat 597, a downwardly inclined coin-passage 600 which terminates at the opposite plate end 601, in a vertical coin-chute 602 extending downwardly through the lower edge 603 of the structure. The coin-receiving mouth 579, passage 598, throat 597, inclined passage 600 and chute 602 are all of a size sufficient to accommodate the largest-diameter coin handled by the machine, as a quarter, while the downward inclination of the passage 600 is such that the coins admitted to the sorting device, may gravitate downwardly therein. A series of openings 604, 605, 606, and 607 (right to left in Fig. 37) are provided in the bottom or lower margin 608 of the passage 600, through which vertical coin-chutes 609, 610, 611 and 612 respectively, communicate with the passage 600. The arrangement is such that the opening 604 and the communicating chute 609 which substantially underlie the coin throat 597, are of a size to receive tokens of a given diameter; the next adjacent opening 605 and its chute 610 of a size to receive dimes; the next opening 606 and chute 611 of a size to accommodate one-cent pieces or pennies; the next opening 607 and its chute 612 of a size to receive nickels, and the last chute 602 as before described, of a size to accommodate quarters. The lower open ends of the several chutes then register with the corresponding coin chambers of the changer 595 therebelow, as the quarter chute 602 with the quarter chamber 595A, the nickel chute 612 with the nickel chamber 595B, and so on through the series.

In order to direct a coin of a given size or denomination, into the particular one of the coin-chutes provided for receiving the same, a coin-chute control device 620 is associated with the chute structure and is operated from and in response to operation of the coin gauge 584. For this purpose, a slot 621 is provided laterally through the chute structure 596 and along the lower margin 608 of the passage 600, through which may be projected a stepped end section 622 of a control plate 623. The plate 623 suitably supported for displacement toward or away from the slot 621, has its stepped section arranged so that when the plate is moved from an initial position outwardly of the slot 621, to a predetermined position, the forwardmost step 624 will project over the opening 604 to the token chute 609, hence closing this chute to the entrance of a coin therein, but permitting a coin to pass over the step and downwardly in the passage 600 to a lower chute. Further movement of the control plate to another predetermined position, will serve to bring the next adjacent step 625 over the opening 605 to coin chute 610, thus closing-off this chute as well as the first chute 609, but permitting a coin to pass through passage 600 to a lower chute. In a similar manner, further successive movements of the control plate through the slot 621, will effect through its steps 626 and 627, successive closures of the chute openings 606 and 607, and hence, when all of the openings 604—607 are thus closed, the only chute remaining open to receive coins will be the last or quarter chute 602.

Operation of the control plate 623 is effected from the coin gauge lever 584 through a drive now to appear. Slidably supported by a bracket 628, is a bar 629 suitably connected at one end, to the plate 623, and provided with gear teeth 629A on its opposite end portion, thus providing a gear rack. Enmeshing with the rack is a gear 630 which is journalled in brackets 631 secured to and depending from the bed plate 554. The bed plate 554 is apertured in the zone of the gear 630 as at 632, through which the gear projects so as to be exposed above the plate (Fig. 36). The location of the gear 630 is such, as appears in Fig. 35, that it closely parallels the bar 588 of the coin gauge device, and further, such that the exposed end of the gear lies relatively adjacent the bar. The bar and gear are operatively connected by a suitable, lost-motion type of connection, as at 633, the arrangement of the connection being such that longitudinal reciprocating movement of the bar 588, as effected by the coin-gauging and return movements of the gauge lever 584, will produce a corresponding rocking movement of the gear 630. The latter then, through the gear rack 629A, effects a corresponding reciprocating movement of the control plate 623 relative to the coin-chute structure.

Before describing the operation of the sorting mechanism, it is to be noted that the control plate 623 is provided with a number of spaced coin-stops 634, 635, 636 and 637, each comprising a U-shaped bar having its lower leg 638 secured to the plate, and its upper leg 639 free of the plate and spaced forwardly of one of the plate steps 624—627 sufficiently to provide clearance for the passage of a coin therebetween (Fig. 36). The legs of the stop 634 project laterally of the sorting structure 596, through apertures provided therein, in the zone between the coin chutes 609 and 610 (Fig. 37), the arrangement of the stop being such that the upper leg thereof normally projects laterally or across the passage 600. The other stops are similarly arranged, but located such that the stop 635 is between the chutes 610 and 611, the stop 636 between the chutes 611 and 612, and the stop 637 between the chutes 612 and 602. The function of these stops will appear now, in the following description of the operation of the sorting mechanism.

Assume for example, that a token is introduced to the singling zone of the machine, thus setting the machine in operation as before described. As the token is displaced toward and into the sorting mechanism, it actuates the gauge lever 584, and the latter in turn and through the connection to the control plate 623, causes an initial movement of the plate toward the slot 621, but without entering one of its stepped elements therein. In this instance, the upper legs of the several coin stops 634-637 project across the passage 600. Further displacement of the token will carry it into the mouth 579 from whence it drops downwardly, on edge, through the passage 598, throat 597 and into the inclined passage 600. Entering the passage 600, the token will be effectively prevented from proceeding downwardly therein, by abutment with the upper leg of the coin stop 634. Hence the token will be constrained thereby, to drop into the token chute 609 and therefrom, into the token chamber 595E of the changer 595. Return movement of the gauge lever 584 to initial position, will thereby effect a retraction of the control plate 623 to its initial position.

In the instance of a dime passing through the machine, the control plate 623 will be similarly actuated, but the extent of forward displacement thereof in this case, is such as to project the step 624 over the token chute 609, and further such as to clear the upper leg of the coin stop 634 from the passage 600. Thus, the dime will then enter the passage 600, ride over the step 624 and enter the dime chute 610. Movement of the dime past the chute 610, is now prevented by the upper leg of the stop 635 spanning the passage 600. In a similar manner, successive displacements of the stepped control plate 623 and its several stops, in response to the passage of pennies, nickels and quarters through the singling and coin-gauge mechanism, will condition the sorting device for directing the coins into the proper coin chutes therefor. In the case of quarters, all of the coin stops 634-637 will be cleared from the passage 600, while the plate 623 effectively closes the coin chutes 609-612, so that the quarter may then gravitate through the length of the passage 600, into its chute 602 and thence into the chamber 595A of changer 595.

As shown by Figs. 36 and 37, provision is made for visual inspection of the coins passing downwardly in the several chutes 602 and 609-612, as from the exterior of the fare box. For this purpose the forward housing wall 31 is recessed inwardly to the zone of the chute structure 596, as at 650, and in the lower forward wall section 651 of the chute structure 596, is located a window 652 giving a direct view of the several chutes and coins therein. To enable removal of spurious coins when thus visually detected in the chutes, the chute wall section 651 containing the window 652, is hinged at its lower end, as at 653, so that the operator may open the windowed section, through a handle 654, for direct access to the coins in the chutes. Necessarily, in this connection, means must be provided for retaining the coins in the chutes at least temporarily, and preferably long enough to facilitate visual inspection of the coins as well as coin-removal when necessary. To this end, there is provided a coin-delay device which is operated in timed relation with the operation of the singling and sorting mechanism, through connection thereof with the drive shaft 569. The delay device in the present example, includes a shiftable plate member 655 arranged horizontally along the lower end of the chute structure and operable in a slot 656 provided therein, such that the plate may be shifted or displaced forwardly in the slot to close the coin discharge ends of the several chutes, as in the position thereof shown by Fig. 36. Actuation of the delay plate 655 from shaft 569 is presently effected by a yieldable connection comprising a rod 657 having one end 658 freely received in an aperture 659 provided therefor in an upstanding lug 660 on the rear end of the plate 655. The rod is yieldably connected to the lug through a coiled spring 661 bearing at one end against the lug and at its opposite end against a nut 662 on the rod. An adjustable assembly nut 663 threadedly received on the end 658 of the rod and abutting the lug 660, serves to retain the rod and spring in assembly with the lug. The opposite end 664 of rod 657 is longitudinally slidably journalled in an upstanding lug 665 on the shaft bracket 570, and carries a roller 666 serving as a cam-follower, in engagement with the cam face of a cam 667 secured to shaft 569. A return spring 668 connected between the plate 655 and a spring-bracket 669, serves to retract the plate from its chute-closing position, and also, to urge the cam-follower rod 657 toward the cam 667 such as to maintain the roller 666 in engagement with the camming surface thereof. The cam 667 is so formed and related to the follower rod 657, that the latter will be released once in each complete revolution of the cam, to permit retraction of the plate 655 from its chute-closing position, as effected by the return spring 668, for a predetermined short period sufficient to allow a coin to pass into the changer 595, the cam thereafter actuating the rod to thereby return the delay plate to its coin-stopping position. Further, the relative momentary retraction of the plate 655 is effected, through proper relation of the cam and follower actuation with the coin singling and sorting function of the mechanism, at a point in the operating cycle of the latter mechanism immediately preceding the delivery of a coin to one of the coin chutes. Thus a coin entering one of the chutes will be retained therein, as visible through the window 652, until immediately prior to the delivery of the next succeeding coin to the same or another of the chutes, and so on for all coins admitted to the machine. As will now readily appear, the function of the yieldable connection between the cam-rod 657 and plate 655, including the spring 661, is such as to prevent stoppage of the shaft 569 in the event the plate 655 becomes jammed or is abnormally held in retracted position. The yieldable shaft drive connection to the plate also serves to permit manual retraction of the latter when desired, as accomplished by means now to be described.

As shown by Fig. 36, provision is made for stoppage of a coin in its chute by means operable independently of the delay-plate 655, and as controlled from the exterior of the fare box. A plate member 670 which may be somewhat similar to the plate 655, is arranged in the housing recess 650, oppositely to and in the plane of the plate 655. The plate 670 as manually controlled from the exterior of the machine, by a finger piece 671, is normally retracted from chute-closing position, to permit full operation of the automatically actuated delay-plate 655. However, when an operator desires to stop a coin in the chute structure, the control plate 670 may be then manually displaced inwardly against the plate 655, to retract the latter and to close the chutes independently thereof. Such retraction of plate 655 is readily permitted by the spring connection 661 and without affecting operation of the drive shaft 569, as pointed out hereinabove. Further, the manually controlled coin-stop plate 670 serves an additional purpose, in that it enables the operator to effect discharge of the last coin received in the chute structure immediately prior to or at the time the machine is cut out of operation, as at the end of the day or run. Such is effected by inward movement of plate 670 to retract the plate 655 from its chute closing position, whereupon a rapid retraction of plates 670 will open the chutes to allow the last coin to pass to its proper place of deposit in the money changer. The discharge of the last coin occurs as above indicated, by reason of the fact that the plate 655 as displaced from chute-closing position by plate 670, will be momentarily retarded in its return movement under the influence of spring 661, by the counter-force of the spring 668, the delay thus effected being sufficient to permit full discharge of the coin.

The operation of the modified singling and sorting mechanism and the several provisions for coin-control in connection with the coin-receiving chute structure of the sorting mechanism, is believed to be now fully apparent from the foregoing description of parts and operation thereof, and hence, to require no further detailed description.

While the invention has been described by making specific reference to presently selected embodiments thereof, the detail of the description is to be understood solely in an illustrative and not in a limiting sense, since numerous changes may be made in the parts, the combinations of elements and the combination of devices embodied in the structure, without departing from the spirit of the invention and the full intended scope of the claims hereunto appended.

I claim as my invention:

1. In a coin handling and registering mechanism, a counter assembly of a type adapted to accumulate cash totals of coins handled by the device, a plurality of pivoted levers for said counter assembly, means responsive to pivotal movement of each lever for effecting a rotative movement of the counter to an extent differing with actuation of the several levers, a lever-actuating slide common to the several levers, and movably disposed for selective engagement therewith, a rotatable shaft, a cam on said shaft, a cam follower on said slide, means for rotating the shaft to actuate the slide and selectively operate the several levers, and coin-gauging means operatively connected to, and arranged for positioning the slide in respect to the several levers, in accordance with the diameter of coins deposited in the mechanism.

2. In a coin handling and registering mechanism, a counter assembly of a type adapted to accumulate cash totals of coins handled by the device, a differential drive mechanism operatively connected to the counter and operable selectively, for effecting different predetermined rotative movements of the counter, a plurality of pivoted levers, means operatively connecting said levers to said differential drive mechanism, for effecting selective actuation of said mechanism in accordance with selective operation of the levers, a lever actuating slide common to the several levers, and movably disposed for selective engagement therewith, a rotatable shaft, a cam on said shaft, a cam follower on said slide, means for rotating the shaft to actuate the slide and selectively operate the several levers, and coin-gauging means operatively connected to, and arranged for positioning the slide in respect to the several levers, in accordance with the diameter of a coin deposited in the mechanism.

3. In a coin handling and registering mechanism, a counter assembly of a type adapted to accumulate cash totals of coins handled by the mechanism, a plurality of pivoted levers for said counter assembly, means responsive to pivotal movement of each lever for effecting a rotative movement of said counter, said means being operable such that the extent of counter rotation resulting from pivotal movement of one lever differs from that resulting from pivotal movement of any other of said levers, said translating means comprising a plurality of co-axial, releasably interconnected gears, counter-actuating pinions enmeshing said gears and operatively connected to said counter, drive means for said gears, and means operatively connecting each of said levers with one of said gears, adapted upon selective actuation of the levers for effecting release of the gear to which the actuated lever is operatively connected, for rotation through said drive means, whereby to effect differential rotative movements of the counter from the pinions enmeshing said gears, a lever-actuating slide common to the several levers, and movably disposed for selective engagement therewith, a rotatable shaft, a cam on said shaft, a cam follower on said slide, means for rotating the shaft to actuate the slide and selectively operate the several levers, and coin-engaging means operatively connected to, and arranged for positioning the slide in respect to the several levers, in accordance with the diameter of a coin deposited in the mechanism.

4. In combination with a counter assembly and at least two selectively movable members, a differential drive mechanism operable responsively to movement of each of said members for effecting rotative movement of the counter to an extent differing with actuation of the several members, said mechanism comprising drive means, a shaft element capable of axial displacement, a clutch between said drive means and shaft element, effective upon axial displacement of the shaft in one direction, to cause shaft rotation by said drive means, means urging said shaft in the opposite direction to disconnect said clutch, a gear fixed to said shaft, a second gear on said shaft and capable of axial displacement, drive means between said counter and said gears, means releasably interconnecting said gears, effective upon axial displacement of the shaft and said gear fixed thereto, in said one direction, to release said gear from said second gear, and effective further, upon axial displacement of said second gear in one direction, to cause corresponding displacement of the first said gear and said shaft in said one direction, means operatively connecting one of said movable members to said shaft, adapted upon actuation of said member, for causing displacement of said shaft and the gear fixed thereto, in said one direction, to effect clutch engagement and release of said gear from the second gear for rotation of the shaft and said gear, whereby to actuate said counter from said gear through said counter drive means, and means operatively connecting the other of said movable members to said second gear, operable in response to actuation of said other movable member, for causing displacement of the second gear in said one direction and through said interconnecting means and said first gear, corresponding displacement of said shaft in said one direction, to effect clutch engagement for rotation of the shaft and said gears, whereby to actuate said counter through said counter drive means.

5. In a mechanism of the character described, providing a coin-receptacle and means defining a plurality of coin-receiving zones, and including a coin-singling member for displacing a coin from said receptacle for deposit in one of the receiving zones, a coin-gauge element positionable responsively to displacement of a coin by said singling member, in accordance with coin dimension, a counter assembly, a plurality of selectively movable elements, operating means for said elements, counter-actuating means operable responsively to movement of said movable elements, for effecting counter actuation to an extent differing with the selective movement of said movable elements, means operated by said coin-gauge element for controlling delivery of a coin into one of said coin-receiving zones and for selecting one of said movable elements for movement by said operating means, and means releasably retaining said gauge operated means in actuated positions.

6. In a coin handling, sorting and registering mechanism, a coin receptacle, a plurality of coin-receiving chutes, a movable coin-singling member adapted for displacing a coin from said receptacle to the zone of said chutes, for delivery into one thereof, a coin-gauge element in the path of coin displacement from said receptacle, positionable by movement of the coin and according to coin dimension, means positionable by said gauge element for guiding the coin into a predetermined one of said chutes, a cash total counter assembly, operating means for selectively actuating said counter assembly, a control element for said operating means, positionable by and in accordance with the coin-positionment of said coin gauge, for determining selective actuation of the counter by said operating means, and means for releasably retaining said control element and said coin delivery means in gauge actuated positions.

7. In a coin handling, sorting and registering mechanism, a coin receptacle, a plurality of coin-receiving chutes, a movable coin-singling member adapted for displacing a coin from said receptacle to the zone of said chutes, for delivery into one thereof, a coin-gauge element in the path of coin displacement from said receptacle, positionable by movement of the coin and according to coin dimension, means positionable by said gauge element for guiding the coin into a predetermined one of said chutes, means for releasably retaining said delivery controlling means in actuated position, a cash total counter assembly, and operating means for selectively actuating said counter assembly, said retaining means including a control element for said operating means, actuated by and in accordance with the coin-positionment of said gauge element, for determining selective actuations of the counter by said operating means.

8. In a coin handling, sorting and registering mechanism of the character hereindescribed, including a movable coin singling member, the improvement which comprises a coin gauge element positionable responsively to displacement of a coin by said movable singling member, in accordance with coin dimension, a cash total counter assembly, a plurality of movable elements, means including a differential drive device operable responsively to movement of each of said movable elements for effecting a rotative movement of said counter, said means being operable such that the extent of counter rotation resulting from movement of one movable element differs from that resulting from movement of any other of said movable elements, an actuating member engageable with said movable elements, said member being selectively positionable relative to said movable elements and operatively connected to said gauge element for positionment thereby according to the coin-positionments of said gauge element, and operating means for moving said actuating member into actuating engagement with said movable elements.

9. In a coin handling, sorting and registering mechanism of the character hereindescribed, including a movable coin singling member, the improvement which comprises a coin gauge element positionable responsively to coin displacement by said movable member, in accordance with coin dimension, a cash total counter assembly, a plurality of movable elements, movement translating means including a differential drive device operable responsively to movement of each of said movable elements for effecting a rotative, cash registering movement of said counter, said translating means being operable such that the extent of counter rotation resulting from movement of one movable element differs from that resulting from movement of any other of said movable elements, a shiftable member operatively connected to said gauge element and shiftable thereby responsively to and in accordance with the coin-positionments of the gauge element, into selective operative registry with said movable elements, and means for operating said shiftable member into actuating engagement with said movable elements.

10. In combination with a counter assembly and a plurality of selectively movable members, a differential drive device operable responsively to movement of each of said members for effecting a rotative movement of the counter to an extent differing with actuation of the several members, said device comprising a plurality of adjacently arranged gears, each capable of axial displacement, a plurality of pinions each enmeshing one of said gears, means providing drive connections between said pinions and said counter, gear drive means, means releasably interconnecting said gears against rotation, adapted responsively to axial displacement of one or more of said gears, to release the displaced gear or gears for rotation by said drive means, and means operatively connecting said movable members to said gears adapted upon selective actuation of the members, for effecting axial displacement of one or more of said gears and release of the displaced gear or gears for rotation through said drive means, whereby to effect different rotative movements of the counter through the pinions enmeshing the gears.

11. In combination with a counter assembly and a plurality of selectively movable members, a differential drive device operable responsively to movement of each of said members for effecting a rotative movement of the counter to an extent differing with actuation of the several members, said device comprising a plurality of coaxially arranged, axially shiftable gears, a plurality of pinions each enmeshing one of said gears, means providing drive connections between said pinions and said counter, means releasably interconnecting said gears against rotation, adapted in response to axial shifting of a gear, to release the shifted gear for rotation, gear drive means, a normally disconnected clutch device between said gears and drive means, operable in response to axial shifting of a gear to connect the shifted gear to said drive means, and means operatively connecting each of said movable members to one of said gears, adapted upon selective actuation of said members, for effecting axial shifting and release of said gears selectively, and connection of said clutch device to drive the selectively released gears from said drive means, whereby to effect different rotative movements of the counter through the pinions enmeshing said gears.

12. In combination with a counter assembly and a plurality of selectively movable members, a differential drive device operable responsively to movement of each of said members for effecting a rotative movement of the counter to an extent differing with actuation of the several members, said device comprising a plurality of coaxially arranged, axially displaceable gears, a plurality of pinions each enmeshing one of said gears, means providing drive connections between said pinions and said counter, means releasably interconnecting the gears against rotation, adapted in response to axial displacement of a gear, to release the displaced gear for rotation, gear drive means, and means operatively connecting each of said movable members to one of said gears, adapted upon selective actuation of the members, for effecting axial displacement of the gears to release the same for rotation through said drive means, whereby to effect different rotative movements of the counter through the pinions enmeshing the gears.

FOUNT F. DAUGHERTY.